US009866318B2

(12) United States Patent
Wang et al.

(10) Patent No.: US 9,866,318 B2
(45) Date of Patent: Jan. 9, 2018

(54) METHOD, APPARATUS, AND SYSTEM FOR ADJUSTING EMISSION PARAMETER OF LASER IN WDM-PON

(71) Applicant: Huawei Technologies Co., Ltd., Shenzhen (CN)

(72) Inventors: Heng Wang, Shenzhen (CN); Zhiguang Xu, Shenzhen (CN); Enyu Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/264,286

(22) Filed: Sep. 13, 2016

(65) Prior Publication Data

US 2017/0005728 A1    Jan. 5, 2017

Related U.S. Application Data

(63) Continuation of application No. PCT/CN2014/073352, filed on Mar. 13, 2014.

(51) Int. Cl.
*H04B 17/00* (2015.01)
*H04B 10/079* (2013.01)
(Continued)

(52) U.S. Cl.
CPC ..... *H04B 10/07955* (2013.01); *H04B 10/071* (2013.01); *H04B 10/272* (2013.01);
(Continued)

(58) Field of Classification Search
CPC .... H04J 14/02; H04J 14/0221; H04J 14/0242; H04B 10/564; H04B 10/071;
(Continued)

(56) References Cited

U.S. PATENT DOCUMENTS

| 5,448,390 A * | 9/1995 | Tsuchiya | ............. H04J 14/02 385/24 |
| 2002/0051284 A1 * | 5/2002 | Takatsu | ............. G06F 12/0866 359/341.1 |

(Continued)

FOREIGN PATENT DOCUMENTS

| CN | 101051869 A | 10/2007 |
| CN | 101483310 A | 7/2009 |

(Continued)

OTHER PUBLICATIONS

Foreign Communication From a Counterpart Application, Chinese Application No. 201480000631.1, Chinese Office Action dated Jan. 4, 2017, 5 pages.

(Continued)

*Primary Examiner* — Don N Vo
(74) *Attorney, Agent, or Firm* — Conley Rose, P.C.

(57) ABSTRACT

A method includes monitoring a power value of output light of the laser and a power value of reflected light, obtaining an insertion loss value according to the power value of the output light, the power value of the reflected light, and a parameter of a Faraday rotation reflector, obtaining a bias current value according to the insertion loss value, and adjusting the power value of the output light of the laser using the bias current value. The insertion loss value is obtained by detecting the power value of the reflected light obtained after the output light of the laser is reflected. Because the insertion loss value is a power loss value, of the output light of the laser, on a one-way link between the laser and the Faraday rotation mirror.

20 Claims, 11 Drawing Sheets

(51) Int. Cl.
*H04B 10/071* (2013.01)
*H04B 10/272* (2013.01)
*H04B 10/564* (2013.01)
*H04B 10/50* (2013.01)
*H04J 14/02* (2006.01)

(52) U.S. Cl.
CPC ....... *H04B 10/503* (2013.01); *H04B 10/5057* (2013.01); *H04B 10/564* (2013.01); *H04J 14/0221* (2013.01); *H04J 14/0242* (2013.01)

(58) Field of Classification Search
CPC ............ H04B 10/572; H04B 10/07955; H04B 10/503; G02B 6/12004
USPC ........................................................... 398/38
See application file for complete search history.

(56) References Cited

U.S. PATENT DOCUMENTS

| | | | |
|---|---|---|---|
| 2004/0067059 A1 | 4/2004 | Song et al. | |
| 2006/0093362 A1* | 5/2006 | Welch | G02B 6/12004 398/87 |
| 2010/0067921 A1* | 3/2010 | Byun | H04B 10/0799 398/182 |
| 2011/0129227 A1 | 6/2011 | Wen et al. | |

FOREIGN PATENT DOCUMENTS

| | | |
|---|---|---|
| CN | 102185658 A | 9/2011 |
| CN | 102722211 A | 10/2012 |
| EP | 2637266 A1 | 9/2013 |
| WO | 2011018054 A1 | 2/2011 |

OTHER PUBLICATIONS

Foreign Communication From a Counterpart Application, PCT Application No. 14885730.3, Extended European Search Report dated Mar. 30, 2017, 5 pages.
Foreign Communication From a Counterpart Application, PCT Application No. PCT/CN2014/073352, English Translation of International Search Report dated Dec. 23, 2014, 2 pages.
Foreign Communication From a Counterpart Application, PCT Application No. PCT/CN2014/073352, English Translation of Written Opinion dated Dec. 23, 2014, 7 pages.

\* cited by examiner

METHOD, APPARATUS, AND SYSTEM FOR ADJUSTING EMISSION PARAMETER OF LASER IN WDM-PON

CROSS-REFERENCE TO RELATED APPLICATIONS

This application is a continuation application of international patent application number PCT/CN2014/073352 filed on Mar. 13, 2014, which is incorporated by reference.

TECHNICAL FIELD

The present disclosure relates to the field of optical communications technologies, and in particular, to a method, an apparatus, and a system for adjusting an emission parameter of a laser in a wavelength division multiplexing passive optical network (WDM-PON).

BACKGROUND

As users impose an increasingly high requirement on network bandwidth, a conventional copper wire bandwidth access system cannot meet the increasingly high user requirement. A WDM-PON technology draws much attention because of its advantages such as a huge broadband capacity and information security that is similar to that of point-to-point communication.

In a WDM-PON system, a node on a user end uses an array waveguide grating (AWG) or a waveguide grating router (WGR) as an optical multiplexer, where wavelengths of all output ports of the AWG or the WGR are different from each other. Optical network units (ONUs) connected to the ports of the AWG or the WGR include two kinds of modules a colored optical module and a colorless optical module.

It is required that an optical signal can be received only when a wavelength of a laser in the ONU is the same as a wavelength of a port of the AWG or the WGR that is connected to the ONU when an ONU is a colored optical module. Therefore, wavelengths of lasers in the ONUs connected to the ports of the AWG or the WGR are different from each other, and the ONUs of the ports cannot be used universally, which leads to a problem such as ONU access difficulty.

To ensure that the ONUs connected to the ports of the AWG or the WGR are unrelated to the wavelengths of the ports connected to the ONUs, and resolve the problem such as ONU access difficulty, a colorless optical module is used as an ONU. An emission wavelength of a laser in the colorless optical module may be automatically adjusted to a wavelength of a port of the AWG or the WGR that is connected to the colorless optical module such that the colorless optical module can be plugged and played on any port.

A stable laser signal can be generated only when a gain of a laser in an ONU is greater than a round-trip loss of an optical signal and when the ONU is a colorless optical module. Therefore, to ensure that the WDM-PON system is in a lasing state, an emission parameter of the laser needs to be adjusted such that power of output light of the system meets an actual application requirement. Currently, in the prior art, the emission parameter of the laser is mainly adjusted using a backlight detection technology, where optical power of backlight of the laser is detected, and the emission parameter of the laser is adjusted according to the optical power of the backlight, to change the power of the output light of the system, thereby implementing adjustment on the power of the output light of the WDM-PON system. However, the backlight detection technology can only directly reflect the power of the output light of the laser, but cannot effectively reflect the power of the output light of the WDM-PON system, leading to low precision when output power of the system is adjusted.

SUMMARY

In view of this, embodiments of the present disclosure provide a method, an apparatus, and a system for adjusting an emission parameter of a laser in a WDM-PON such that an insertion loss value is obtained using a power value of output light of the laser, a power value of reflected light, and a parameter of a Faraday rotation mirror, and a bias current value for adjusting power of the output light of the laser is obtained according to the insertion loss value.

A first aspect of the embodiments of the present disclosure provides a method for adjusting an emission parameter of a laser, where the method is applied to a wavelength division multiplexing passive optical network system, and includes monitoring a power value of output light of the laser and a power value of reflected light, where the reflected light is light reflected back by a Faraday rotation mirror when the output light passes through the Faraday rotation mirror, obtaining an insertion loss value according to the power value of the output light, the power value of the reflected light, and a parameter of the Faraday rotation mirror, where the insertion loss value is a power loss, of the output light of the laser, on a one-way link between the laser and the Faraday rotation mirror, obtaining a bias current value according to the insertion loss value, and adjusting the power value of the output light of the laser using the obtained bias current value.

According to the method, in a first possible implementation manner of the first aspect of the embodiments of the present disclosure, the method further includes calibrating a wavelength of the output light of the laser.

With reference to the first aspect of the embodiments of the present disclosure to the first possible implementation manner of the first aspect, in a second possible implementation manner, monitoring a power value of output light of the laser and a power value of reflected light includes splitting light in a first preset proportion from the output light of the laser as a first optical signal, splitting light in a second preset proportion from the reflected light as a second optical signal, detecting whether a polarization direction of the second optical signal is perpendicular to a polarization direction of the first optical signal, receiving both the first optical signal and the second optical signal, to obtain a power sum of the first optical signal and the second optical signal as a combined optical power value when the polarization direction of the second optical signal is perpendicular to the polarization direction of the first optical signal, shielding the first optical signal or the second optical signal, receiving the unshielded second optical signal or the unshielded first optical signal, to obtain power of the unshielded second optical signal or the unshielded first optical signal as a tributary optical power value, and obtaining the power value of the output light and the power value of the reflected light according to the combined optical power value and the tributary optical power value.

With reference to the first aspect of the embodiments of the present disclosure to the first possible implementation manner of the first aspect, in a third possible implementation manner, monitoring a power value of output light of the laser and a power value of reflected light includes splitting light in a first preset proportion from the output light of the laser as a first optical signal, splitting light in a second preset proportion from the reflected light as a second optical signal, receiving the first optical signal to obtain a first optical power value, detecting whether a polarization direction of the second optical signal is perpendicular to a polarization direction of the first optical signal, receiving the second optical signal to obtain a second optical power value when the polarization direction of the second optical signal is perpendicular to the polarization direction of the first optical signal, obtaining the power value of the output light according to the first optical power value, and obtaining the power value of the reflected light according to the second optical power value.

With reference to the first aspect of the embodiments of the present disclosure to the first possible implementation manner of the first aspect, in a fourth possible implementation manner, monitoring a power value of output light of the laser and a power value of reflected light includes splitting light in a first preset proportion from the output light of the laser as a first optical signal, receiving the first optical signal to obtain a first optical power value, obtaining the power value of the output light according to the first optical power value, detecting whether a polarization direction of the reflected light is perpendicular to a polarization direction of the first optical signal, and receiving the reflected light to obtain the power value of the reflected light when the polarization direction of the reflected light is perpendicular to the polarization direction of the first optical signal.

With reference to the first aspect of the embodiments of the present disclosure to the fourth possible implementation manner of the first aspect, in a fifth possible implementation manner, obtaining a bias current value according to the insertion loss value includes querying a first pre-configured file, where the first pre-configured file includes a correspondence between a bias current of the laser and the insertion loss value, of the output light of the laser, on the one-way link between the laser and the Faraday rotation mirror, and obtaining, in the first pre-configured file, the bias current value corresponding to the insertion loss value.

With reference to the first aspect of the embodiments of the present disclosure to the fourth possible implementation manner of the first aspect, in a sixth possible implementation manner, obtaining a bias current value according to the insertion loss value includes calculating a fiber length of the one-way link between the laser and the Faraday rotation mirror according to the insertion loss value, querying a second pre-configured file, where the second pre-configured file includes a correspondence between the fiber length and a bias current of the laser, and obtaining, in the second pre-configured file, the bias current value corresponding to the fiber length.

A second aspect of the embodiments of the present disclosure provides an apparatus for adjusting an emission parameter of a laser, where the apparatus is applied to a wavelength division multiplexing passive optical network system, and includes a monitoring device configured to monitor a power value of output light of the laser and a power value of reflected light, where the reflected light is light reflected back by a Faraday rotation mirror when the output light passes through the Faraday rotation mirror, a processing device configured to obtain an insertion loss value according to the power value of the output light, the power value of the reflected light, and a parameter of the Faraday rotation reflector, and obtain a bias current value according to the insertion loss value, where the insertion loss value is a power loss, of the output light of the laser, on a one-way link between the laser and the Faraday rotation mirror, and a driving device configured to adjust power of the output light of the laser using the obtained bias current value.

In a first possible implementation manner of the second aspect of the embodiments of the present disclosure, the apparatus is further configured to calibrate an output wavelength of the laser.

With reference to the second aspect of the embodiments of the present disclosure to the first possible implementation manner of the second aspect, in a second possible implementation manner, the monitoring device includes a planar optical waveguide, a variable optical attenuator, a polarization beam splitter, and a first photodiode, where two optical splitting grooves are engraved on the planar optical waveguide, where the variable optical attenuator is disposed on either optical splitting groove, and the polarization beam splitter is disposed at an intersection of the two optical splitting grooves. The first optical splitting groove is configured to split light in a first preset proportion from the output light of the laser as a first optical signal. The second optical splitting groove is configured to split light in a second preset proportion from the reflected light as a second optical signal. The polarization beam splitter is configured to detect whether a polarization direction of the second optical signal is perpendicular to a polarization direction of the first optical signal, and transmit the first optical signal and the second optical signal whose polarization direction is perpendicular to the polarization direction of the first optical signal. The variable optical attenuator is configured to shield the first optical signal or the second optical signal transmitted on the optical splitting groove in which the variable optical attenuator is located. The first photodiode is configured to receive both the first optical signal and the second optical signal, to obtain a power sum of the first optical signal and the second optical signal as a combined optical power value when the polarization direction of the second optical signal is perpendicular to the polarization direction of the first optical signal, receive power of the unshielded second optical signal or the unshielded first optical signal as a tributary optical power value, and obtain the power of the output light and the power value of the reflected light according to the combined optical power value and the tributary optical power value.

With reference to the second aspect of the embodiments of the present disclosure to the first possible implementation manner of the second aspect, in a third possible implementation manner, the monitoring device includes a planar optical waveguide, two polarization detectors, a second photodiode, and a third photodiode, where the polarization detector is a polarization analyzer or a polarization beam splitter, two optical splitting grooves are engraved on the planar optical waveguide, where each optical splitting groove is provided with one polarization detector. The first optical splitting groove is configured to split light in a first preset proportion from emitted light of the laser as a first optical signal. The second optical splitting groove is configured to split light in a second preset proportion from the reflected light as a second optical signal. The two polarization detectors are configured to detect whether a polarization direction of the second optical signal is perpendicular to a polarization direction of the first optical signal, where each polarization detector can only transmit an optical signal in a preset polarization direction. The second photodiode receives the first optical signal to obtain a first optical power value, and obtains the power value of the output light according to first optical power. The third photodiode is configured to, receive the second optical signal to obtain a second optical power value, and obtain the power value of the reflected light according to the second optical power value when the polarization direction of the second optical signal is perpendicular to the polarization direction of the first optical signal.

With reference to the second aspect of the embodiments of the present disclosure to the first possible implementation manner of the second aspect, in a fourth possible implementation manner, the monitoring device includes a planar optical waveguide, a polarization beam splitter, a fourth photodiode, and a fifth photodiode, where the polarization beam splitter is disposed on a transmission channel of the output light. One optical splitting groove is engraved on the planar optical waveguide, where the optical splitting groove is configured to split light in a first preset proportion from the output light of the laser as a first optical signal. The polarization beam splitter is configured to detect whether a polarization direction of the reflected light that is reflected back is perpendicular to a polarization direction of the first optical signal, and transmit the reflected light whose polarization direction is perpendicular to the polarization direction of the first optical signal. The fourth photodiode is configured to receive the first optical signal to obtain a first optical power value, and obtain the power value of the output light according to the first optical power value. The fifth photodiode is configured to receive the reflected light transmitted from the polarization beam splitter, to obtain the power value of the reflected light when the polarization direction of the reflected light is perpendicular to the polarization direction of the first optical signal.

With reference to the second aspect of the embodiments of the present disclosure to the first possible implementation manner of the second aspect, in a fifth possible implementation manner, the monitoring device includes a partial reflector, a polarization detector, a sixth photodiode, and a seventh photodiode, where the polarization detector is a polarization analyzer or a polarization beam splitter. The partial reflector is configured to split light in a first preset proportion from the output light of the laser as a first optical signal, and reflect the reflected light to the polarization detector. The polarization detector is configured to detect whether a polarization direction of the reflected light is perpendicular to a polarization direction of the first optical signal, and transmit the reflected light whose polarization direction is perpendicular to the polarization direction of the first optical signal. The sixth photodiode is configured to receive the first optical signal to obtain a first optical power value, and obtain the power value of the output light according to the first optical power value. The seventh photodiode is configured to receive the reflected light transmitted from the polarization detector, to obtain the power value of the reflected light when the polarization direction of the reflected light is perpendicular to the polarization direction of the first optical signal.

With reference to the second aspect of the embodiments of the present disclosure to the first possible implementation manner of the second aspect, in a sixth possible implementation manner, the monitoring device includes a partial reflector, a polarization beam splitter, an eighth photodiode, and a ninth photodiode, where the polarization beam splitter is disposed on a propagation channel of the output light. The partial reflector is configured to split light in a first preset proportion from the output light of the laser as a first optical signal. The polarization beam splitter is configured to detect whether a polarization direction of the reflected light is perpendicular to a polarization direction of the first optical signal, and transmit the reflected light whose polarization direction is perpendicular to the polarization direction of the first optical signal. The eighth photodiode is configured to receive the first optical signal to obtain a first optical power value, and obtain the power value of the output light according to the first optical power value. The ninth photodiode is configured to receive the reflected light transmitted from the polarization beam splitter, to obtain the power value of the reflected light when the polarization direction of the reflected light is perpendicular to the polarization direction of the first optical signal.

With reference to the second aspect of the embodiments of the present disclosure to the first possible implementation manner of the second aspect, in a seventh possible implementation manner, the monitoring apparatus includes a polarization beam splitter with a partial reflection function, a tenth photodiode, and an eleventh photodiode, where the polarization beam splitter with a partial reflection function is disposed on a propagation channel of the output light. The polarization beam splitter with a partial reflection function is configured to split light in a first preset proportion from the output light of the laser as a first optical signal, detect whether a polarization direction of the reflected light is perpendicular to a polarization direction of the first optical signal, and transmit the reflected light whose polarization direction is perpendicular to the polarization direction of the first optical signal. The tenth photodiode is configured to receive the first optical signal to obtain a first optical power value, and obtain the power value of the output light according to the first optical power value. The eleventh photodiode is configured to receive the reflected light transmitted from the polarization beam splitter with a partial reflection function, to obtain the power value of the reflected light when the polarization direction of the reflected light is perpendicular to the polarization direction of the first optical signal.

With reference to the second aspect of the embodiments of the present disclosure to the seventh possible implementation manner of the second aspect, in an eighth possible implementation manner, the processing device includes a first query unit configured to query a first pre-configured file, where the first pre-configured file includes a correspondence between a bias current of the laser and the insertion loss value, of the output light of the laser, on the one-way link between the laser and the Faraday rotation mirror, and a first obtaining unit configured to obtain, in the first pre-configured file, the bias current value corresponding to the insertion loss value.

With reference to the second aspect of the embodiments of the present disclosure to the seventh possible implementation manner of the second aspect, in a ninth possible implementation manner, the processing device includes a calculation unit configured to calculate a fiber length of the one-way link between the laser and the Faraday rotation mirror according to the insertion loss value, a second query unit configured to query a second pre-configured file, where the second pre-configured file includes a correspondence between the fiber length and a bias current of the laser, and a second obtaining unit configured to obtain, in the second pre-configured file, the bias current value corresponding to the fiber length.

A third aspect of the embodiments of the present disclosure provides an optical network unit, where the optical network unit includes a laser and the apparatus for adjusting an emission parameter of a laser according to the second aspect, where the apparatus for adjusting an emission parameter of a laser includes a monitoring device, a processing device, and a driving device, and the monitoring device is disposed on a transmission channel of output light of the laser, the processing device is connected to the monitoring device, and the driving device is separately connected to the processing device and the laser.

A fourth aspect of the embodiments of the present disclosure provides an optical line terminal, where the optical line terminal includes a laser and the apparatus for adjusting an emission parameter of a laser, where the apparatus for adjusting an emission parameter of a laser includes a monitoring device, a processing device, and a driving device, and the monitoring device is disposed on a transmission channel of output light of the laser, the processing device is connected to the monitoring device, and the driving device is separately connected to the processing device and the laser.

A fifth aspect of the embodiments of the present disclosure provides a wavelength division multiplexing passive optical network system, where the system includes the optical network unit, the optical line terminal according to fourth aspect, two optical multiplexers, and two Faraday rotation mirrors, the optical network unit is connected to a distribution port of a first optical multiplexer, and a first Faraday rotation mirror is disposed at a common port of the first optical multiplexer, the optical line terminal is connected to a distribution port of a second optical multiplexer, and a second Faraday rotation mirror is disposed at a common port of the second optical multiplexer. An output end of the first Faraday rotation mirror is connected to an output end of the second Faraday rotation mirror. The first optical multiplexer is configured to multiplex output light, received by the distribution port, of the optical network unit and output the output light to the common port, and demultiplex, to the distribution port, a part of a multiplexed optical signal reflected back by the first Faraday rotation mirror. The first Faraday rotation mirror is configured to reflect back, to the common port of the first optical multiplexer, the part of the multiplexed optical signal that is output by the common port of the first optical multiplexer, and transmit the other part to a transmission fiber. The second optical multiplexer is configured to multiplex output light, received by the distribution port, of the optical line terminal and output the output light to the common port, and demultiplex, to the distribution port, a part of a multiplexed optical signal reflected back by the second Faraday rotation mirror, and the second Faraday rotation mirror is configured to reflect back, to the common port of the second optical multiplexer, the part of the multiplexed optical signal that is output by the common port of the second optical multiplexer, and transmit the other part to the transmission fiber.

It can be known from the foregoing content that, the present disclosure has the following beneficial effects.

The embodiments of the present disclosure provide a method, an apparatus, and a system for adjusting an emission parameter of a laser in a WDM-PON, where the method includes monitoring a power value of output light of the laser and a power value of reflected light, where the reflected light is light reflected back by a Faraday rotation mirror when the output light passes through the Faraday rotation mirror, obtaining an insertion loss value according to the power value of the output light, the power value of the reflected light, and a parameter of the Faraday rotation reflector, where the insertion loss value is a power loss, of the output light of the laser, on a one-way link between the laser and the Faraday rotation mirror, and obtaining a bias current value according to the insertion loss value, and adjusting the power value of the output light of the laser using the bias current value. The insertion loss value is obtained by detecting the power value of the reflected light obtained after the output light of the laser is reflected. Because the insertion loss value is a power loss value, of the output light of the laser, on a one-way link between the laser and the Faraday rotation mirror, that is, a one-way loss for transmitting the output light of the laser to a common output port of an optical multiplexer, the insertion loss value can be used to precisely reflect a power value of output light of a WDM-PON system, to adjust the power value of the output light of the laser, thereby improving precision of adjusting power of the output light of the WDM-PON system.

BRIEF DESCRIPTION OF DRAWINGS

To describe the technical solutions in the embodiments of the present disclosure more clearly, the following briefly describes the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

To give an implementation solution of adjusting an emission parameter of a laser in a WDM-PON, embodiments of the present disclosure provide a method, an apparatus, and a system for adjusting an emission parameter of a laser in a WDM-PON. The following describes exemplary embodiments of the present disclosure with reference to the accompanying drawings of this specification. It should be understood that the exemplary embodiments described herein are merely used to describe and explain the present disclosure rather than intended to limit the present disclosure. In addition, as long as no conflict is caused, the embodiments of this application and features in the embodiments may be combined.

Figure 1:
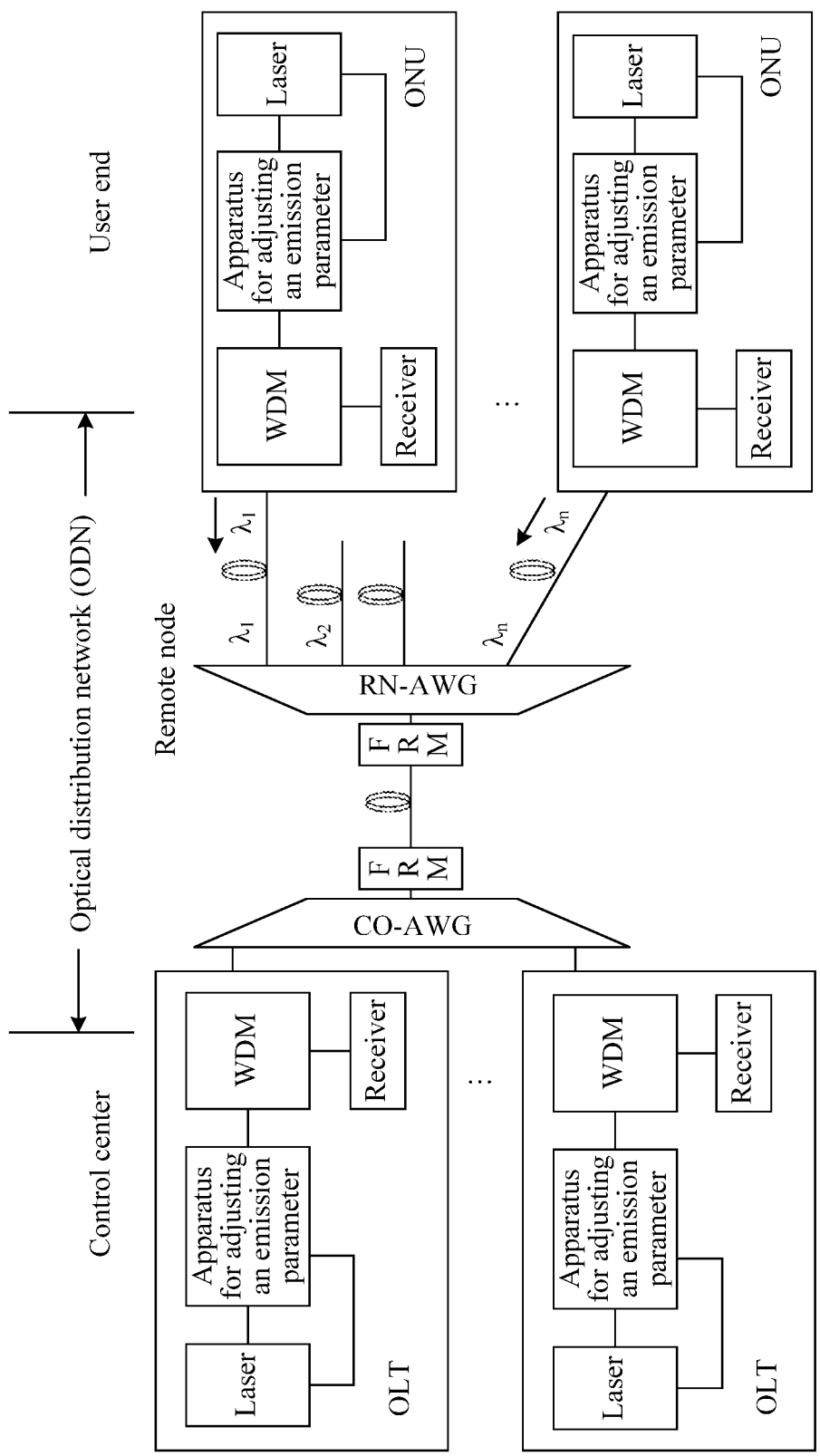
FIG. 1 is a schematic structural diagram of a WDM-PON system according to the present disclosure.

FIG. 1 is a schematic structural diagram of a WDM-PON system according to the present disclosure. The entire WDM-PON system includes two parts, a user end and a control center.

The user end includes multiple ONUs, the multiple ONUs are connected to a first optical multiplexer (remote node AWG (RN-AWG)) using transmission fibers, and the first optical multiplexer is an output port of an optical signal of the user end. Distribution ports of the first optical multiplexer respectively receive output light of the ONUs connected to the distribution ports, and the first optical multiplexer multiplexes the output light of the multiple ONUs and then transmits the output light to a common port of the first optical multiplexer. The common port of the first optical multiplexer outputs a multiplexed optical signal to a first Faraday rotation mirror, and the first Faraday rotation mirror reflects a part of the multiplexed optical signal back to the common port of the first optical multiplexer, and transmits the other part to a transmission fiber to transmit the other part to the control center.

The control center includes multiple optical line terminal (OLT) transceiver devices, each OLT transceiver device is connected to a second optical multiplexer (central office AWG (CO-AWG)) using a fiber, and the second optical multiplexer is an output port of an optical signal of the control center. Distribution ports of the second optical multiplexer respectively receive output light of the OLTs connected to the distribution ports, and the second optical multiplexer multiplexes the output light of the multiple OLTs and then transmits the output light to a common port of the second optical multiplexer. The common port of the second optical multiplexer outputs a multiplexed optical signal to a second Faraday rotation mirror, and the second Faraday rotation mirror reflects a part of the multiplexed optical signal back to the common port of the second optical multiplexer, and transmits the other part to a transmission fiber to transmit the other part to the user end.

It should be noted herein that, the embodiments provided in the present disclosure not only may be applied to the user end of the WDM-PON system, but also may be applied to the control center. For ease of description, in the following embodiments, an example in which the embodiments are applied to the user end is used for description. A case in which the embodiments are applied to the control center is similar thereto, which is not described herein again.

The following further describes the embodiments of the present disclosure in detail with reference to accompanying drawings.

Embodiment 1

Figure 2:
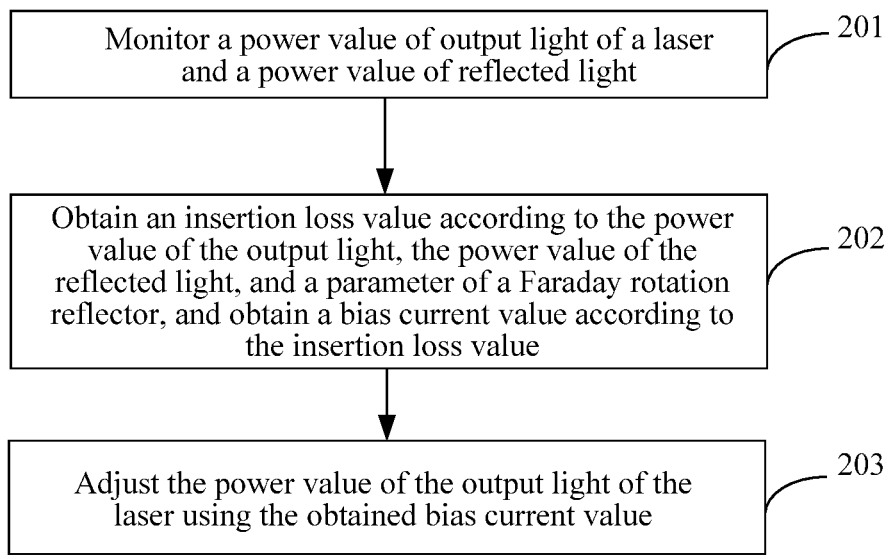
FIG. 2 is a flowchart of Embodiment 1 of a method for adjusting an emission parameter of a laser in a WDM-PON according to the present disclosure.

FIG. 2 is a flowchart of Embodiment 1 of a method for adjusting an emission parameter of a laser in a WDM-PON according to the present disclosure. The method includes the following steps.

Step 201: Monitor a power value of output light of the laser and a power value of reflected light, where the reflected light is light reflected back by a Faraday rotation mirror when the output light passes through the Faraday rotation mirror.

In the WDM-PON system, an optical multiplexer (AWG or WGR) includes multiple distribution ports and one common port, where the distribution ports are separately connected to lasers in ONUs (OLTs) with different transmission wavelengths, and the common port is connected to a feeder fiber. The optical multiplexer multiplexes light with different wavelengths that is output by different lasers and that is received from the distribution ports, to obtain a multiplexed optical signal, and outputs the multiplexed optical signal from the common port of the optical multiplexer. A Faraday rotation mirror is placed at the common port of the optical multiplexer, a part of the multiplexed optical signal that is output by the optical multiplexer is reflected back to the common port of the optical multiplexer to be demultiplexed and then transmitted back to the distribution ports, and the other part is transmitted to a transmission fiber. Light reflected back to the distribution ports is reflected light on tributaries.

The WDM-PON system may use an Injection-Lock Fabry-Perot (denoted as Injection-Lock FP-LD, or IL FP-LD) laser or a reflective semiconductor optical amplifier (RSOA) as a light source of the system.

Because of special optical properties of the Faraday rotation mirror, a polarization direction of output light of the laser is perpendicular to a polarization direction of reflected light that is reflected back. A power value of the output light of the laser is monitored, and a power value of the reflected light that is reflected back and whose polarization direction is perpendicular to the polarization direction of the output light is monitored.

Step 202: Obtain an insertion loss value according to the power value of the output light, the power value of the reflected light, and a parameter of the Faraday rotation reflector, and obtain a bias current value according to the insertion loss value.

The insertion loss value is a power loss, of the output light of the laser, on a one-way link between the laser and the Faraday rotation mirror, and the parameter of the Faraday rotation mirror refers to transmittance or reflectivity of the Faraday rotation mirror.

Because transmission channels of optical signals between the laser and the Faraday rotation mirror are the same, an optical loss, on a transmission channel, of transmitting the output light of the laser to the Faraday rotation mirror is the same as an insertion loss value, on the transmission channel, of transmitting, to the laser, the reflected light reflected back by the Faraday rotation mirror.

Therefore, the insertion loss value, on the one-way transmission channel, of the output light of the laser may be calculated using a formula (1):

$$P_{loss} = \frac{rP_{out} - P_{reflected}}{1+r}, \quad (1)$$

where $P_{loss}$ is the insertion loss value on the one-way transmission channel, $P_{out}$ is power of the output light of the laser, $P_{reflected}$ is power of the reflected light of the laser, and r is reflectivity of the Faraday rotation mirror. It should be noted herein that, transmittance T of the Faraday rotation mirror may also be used, where r+τ=1.

It should be noted herein that, there are three possible implementation manners of obtaining a bias current value according to the insertion loss value.

A first possible implementation manner includes querying a first pre-configured file, where the first pre-configured file includes a correspondence between a bias current of the laser and the insertion loss value, of the output light of the laser, on the one-way link between the laser and the Faraday rotation mirror, and obtaining, in the first pre-configured file, the bias current value corresponding to the insertion loss value.

The first pre-configured file includes the correspondence between the bias current value of the laser and the insertion loss value, of the output light of the laser, on the one-way link between the laser and the Faraday rotation mirror. The first pre-configured file is obtained by measuring relationships between different insertion loss values in one or some ONUs (OLTs) and the bias current value of the laser when the WDM-PON system is established, and the insertion loss value and the bias current value are basically in a linear relationship. Because structures of ONUs or OLTs in the system are the same, the first pre-configured file may be used universally in the ONUs or OLTs in the system.

A second possible implementation manner includes calculating a fiber length of the one-way link between the laser and the Faraday rotation mirror according to the insertion loss value, querying a second pre-configured file, where the second pre-configured file includes a correspondence between the fiber length and a bias current of the laser, and obtaining, in the second pre-configured file, the bias current value corresponding to the fiber length.

The fiber length of the one-way link between the laser and the Faraday rotation mirror may be calculated according to the insertion loss value using a formula (2), $$L_{fiber} = \frac{P_{loss} - P_{power\ loss\ value}}{\alpha} \quad (2)$$

where $P_{powerlossvalue}$ is a power loss value on a tributary channel, used to receive the output light of the laser, in the optical multiplexer, and a is a fiber loss per unit of length. The second pre-configured file includes the correspondence between the bias current value of the laser and the fiber length, of the output light of the laser, on the one-way link between the laser and the Faraday rotation mirror. The second pre-configured file is obtained by measuring relationships between different fiber lengths in one or some ONUs (OLTs) and the bias current value of the laser when the WDM-PON system is established, and the fiber length and the bias current value are basically in a linear relationship. Because structures of ONUs or OLTs in the system are the same, the second pre-configured file may be used universally in the ONUs or OLTs in the system.

A third possible implementation manner includes calculating a fiber length of the one-way link between the laser and the Faraday rotation mirror according to the insertion loss value, querying a third pre-configured file, where the third pre-configured file includes a correspondence between a link parameter and a bias current of the laser, and the link parameter includes the insertion loss value and the fiber length, and obtaining, in the third pre-configured file, the bias current value corresponding to the link parameter.

A fiber length calculation method is the same as the fiber length calculation method in the second possible implementation manner. For details, refer to the fiber length calculation method in the second possible implementation manner, which are not described herein again.

The third pre-configured file includes the correspondence between the bias current value of the laser and the link parameter, of the output light of the laser, on the one-way link between the laser and the Faraday rotation mirror, where the link parameter includes the insertion loss value and the fiber length. The third pre-configured file is obtained by measuring relationships between different link parameters in one or some ONUs (OLTs) and the bias current value of the laser when the WDM-PON system is established, and the link parameter and the bias current value are basically in a linear relationship. Because structures of ONUs or OLTs in the system are the same, the third pre-configured file may be used universally in the ONUs or OLTs in the system.

The foregoing three manners for obtaining a bias current are related to content in a pre-configured file that is preset, and a suitable manner is selected according to a correspondence between a bias current and an insertion loss value and/or a fiber length in the pre-configured file.

Step 203: Adjust the power value of the output light of the laser using the obtained bias current value.

A bias current value, of the laser, required on a transmission channel between the laser and the Faraday rotation mirror may be obtained according to the insertion loss value, and the power value of the output light of the laser is automatically adjusted using the bias current value such that a power value of an optical signal transmitted by the Faraday rotation mirror meets a requirement of the WDM-PON system.

It can be known from the foregoing content that, the present disclosure has the following beneficial effects.

A power value of output light of a laser and a power value of reflected light are monitored, where the reflected light is light reflected back by a Faraday rotation mirror when the output light passes through the Faraday rotation mirror. An insertion loss value is obtained according to the power value of the output light, the power value of the reflected light, and a parameter of the Faraday rotation reflector, and a bias current value is obtained according to the insertion loss value, where the insertion loss value is a power loss, of the output light of the laser, on a one-way link between the laser and the Faraday rotation mirror, and the power value of the output light of the laser is adjusted using the bias current value. The insertion loss value is obtained by detecting the power value of the reflected light obtained after the output light of the laser is reflected. Because the insertion loss value is a power loss value, of the output light of the laser, on a one-way link between the laser and the Faraday rotation mirror, that is, a one-way loss for transmitting the output light of the laser to a common output port of an optical multiplexer, the insertion loss value can be used to precisely reflect a power value of output light of a WDM-PON system, to adjust the power value of the output light of the laser, thereby improving precision of adjusting power of the output light of the WDM-PON system.

Embodiment 2

Figure 3:
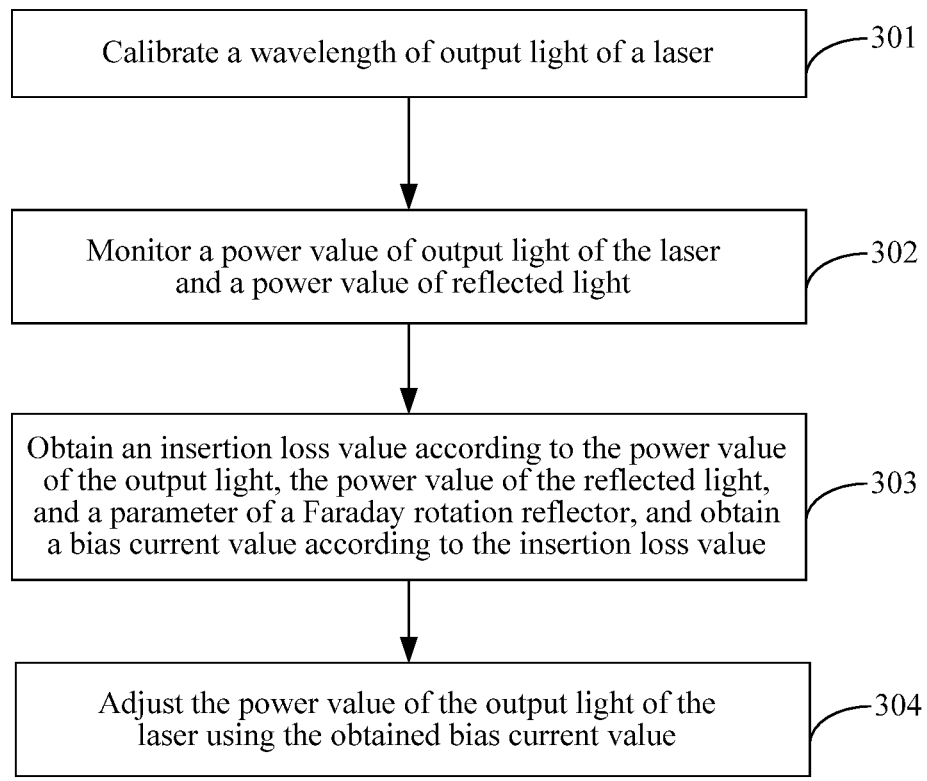
FIG. 3 is a flowchart of Embodiment 2 of a method for adjusting an emission parameter of a laser in a WDM-PON according to the present disclosure.

FIG. 3 is a flowchart of Embodiment 2 of a method for adjusting an emission parameter of a laser in a WDM-PON according to the present disclosure. Compared with Embodiment 1, Embodiment 2 further includes calibrating a wavelength of the output light of the laser. The method includes the following steps.

Step 301: Calibrate a wavelength of output light of the laser.

The wavelength of the output light of the laser changes according to different wavelength setting parameters, where the wavelength setting parameter includes a distributed Bragg reflector (DBR) current, a phase current, an microelectro-mechanical systems (MEMS) voltage, or the like. Before a power value of the output light of the laser is adjusted, the wavelength of the output light of the laser is calibrated first such that the wavelength of the output light of the laser is a transmission wavelength of a distribution port of an optical multiplexer that is connected to the laser. The output light of the laser can be transmitted to a Faraday rotation mirror disposed at a common port of the optical multiplexer, and reflected light reflected back by the Faraday rotation mirror can be obtained only when the wavelength of the output light of the laser is the transmission wavelength of the distribution port of the optical multiplexer that is connected to the laser.

There are two possible implementation manners of calibrating a wavelength of the output light of the laser.

A first possible implementation manner includes monitoring power values of multiple pieces of reflected light obtained after multiple pieces of output light of the laser are reflected, where a power value of each piece of reflected light corresponds to a group of wavelength setting parameters, obtaining a wavelength setting parameter corresponding to a maximum power value of the reflected light, as a wavelength calibration parameter, and calibrating the wavelength of the output light of the laser according to the wavelength calibration parameter.

Different wavelength setting parameters are set for the laser, power values of the reflected light of the output light of the laser when different wavelength setting parameters are used are received, and each power value of the reflected light corresponds to a wavelength setting parameter. Power of the output light of the laser remains unchanged. The output light may be transmitted through the optical multiplexer and reflected back by the Faraday rotation mirror when the wavelength of the output light of the laser is the same as the transmission wavelength of the distribution port of the optical multiplexer that is connected to the laser. In this case, the reflected light has a maximum power value. That is, when it is detected that the reflected light has maximum power, a wavelength setting parameter corresponding to the maximum power value of the reflected light is a wavelength calibration parameter, the wavelength setting parameter of the laser is automatically adjusted to be equal to the wavelength calibration parameter, and the wavelength of the output light of the laser is the transmission wavelength of the distribution port of the optical multiplexer.

It should be noted herein that, when the wavelength of the output light of the laser is actually adjusted, the wavelength setting parameter of the laser may be gradually changed, and a power value of the reflected light when this wavelength setting parameter is used is measured. Changing of the wavelength of the output light of the laser is stopped when the reflected light has a maximum power value. It is because the output light of the laser can be transmitted to the Faraday rotation mirror disposed at the common port, and reflected light received after the Faraday rotation reflector reflects the output light has a maximum power value only when the wavelength of the output light of the laser is the same as the transmission wavelength of the distribution port of the optical multiplexer that is connected to the laser.

A second possible implementation manner includes monitoring multiple power difference values, where each power difference value is a difference between the power value of the output light of the laser and the power value of the reflected light obtained after the output light of the laser is reflected, and each power difference value corresponds to a group of wavelength setting parameters, obtaining a wavelength setting parameter corresponding to a minimum power difference value, as a wavelength calibration parameter, and calibrating the wavelength of the output light of the laser according to the wavelength calibration parameter.

The reflected light of the output light of the laser has a maximum power value when the wavelength of the output light of the laser is same as the transmission wavelength of the distribution port of the optical multiplexer that is connected to the laser. The power of the output light of the laser remains unchanged. In this case, the difference between the power of the reflected light and the power of the output light has a minimum value, and a wavelength setting parameter corresponding to the minimum power difference value is selected as a wavelength calibration parameter. The wavelength setting parameter of the laser is automatically adjusted to the wavelength calibration parameter, to calibrate an output wavelength of the laser.

It should be noted herein that, when the wavelength of the laser is actually adjusted, the wavelength setting parameter of the laser may be gradually changed, and the power value of the output light of the laser and the power value of the reflected light of the output light when this wavelength setting parameter is used are measured. Changing of the wavelength of the output light of the laser is stopped when the difference between the power value of the reflected light and the power value of the output light has a minimum value. It is because only when the wavelength of the output light of the laser is the same as the transmission wavelength of the distribution port of the optical multiplexer that is connected to the laser, the output light of the laser can be transmitted to the Faraday rotation mirror disposed at the common port, and reflected light received after the output light is reflected by the Faraday rotation reflector has maximum power, that is, the difference between the power value of the output light and the power value of the reflected light has a minimum value.

Step 302: Monitor a power value of output light of the laser and a power value of reflected light, where the reflected light is light reflected back by a Faraday rotation mirror when the output light passes through the Faraday rotation mirror.

Step 303: Obtain an insertion loss value according to the power value of the output light, the power value of the reflected light, and a parameter of the Faraday rotation reflector, and obtain a bias current value according to the insertion loss value.

The insertion loss value is a power loss, of the output light of the laser, on a one-way link between the laser and the Faraday rotation mirror.

Step 304: Adjust the power value of the output light of the laser using the obtained bias current value.

Step 302, step 303, and step 304 are adjusting power of emitted light of the laser, and are similar to those in Embodiment 1. For details, refer to the description in Embodiment 1, which are not described herein again.

It can be known from the foregoing content that, compared with Embodiment 1, Embodiment 2 further has the following beneficial effects.

Before power of output light of a laser is adjusted, a wavelength of the output light of the laser is first calibrated such that the wavelength of the output light of the laser is a transmission wavelength of a distribution port of an optical multiplexer that is connected to the laser, and then the power of the output light of the laser is adjusted. In this way, it can be ensured that the output light of the laser is transmitted through the optical multiplexer connected to the laser as much as possible, thereby further increasing a power value of the output light of the laser.

It should be noted herein that, in all of Embodiment 3 to Embodiment 5, the method for adjusting an emission parameter of a laser is described in detail, where a wavelength of output light of the laser is first calibrated, and then power of the output light of the laser is adjusted. In Embodiment 2, two possible implementation manners of wavelength calibration are further described, and in all of Embodiment 3 to Embodiment 5, a first possible implementation manner is used as an example for description, and a second possible implementation manner is also applicable, which is not described again.

Embodiment 3

Figure 4:
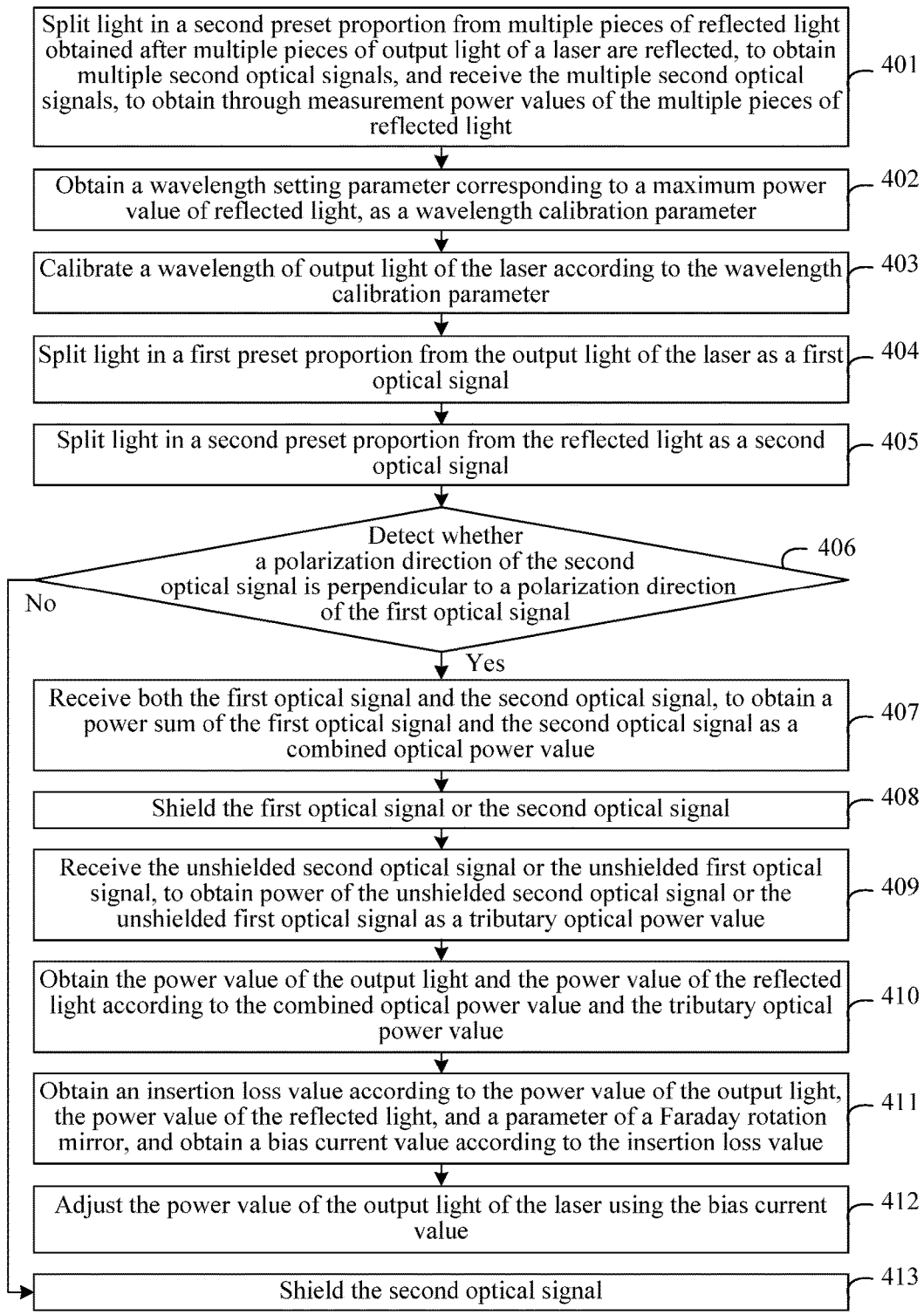
FIG. 4 is a flowchart of Embodiment 3 of a method for adjusting an emission parameter of a laser in a WDM-PON according to the present disclosure.

FIG. 4 is a flowchart of Embodiment 3 of a method for adjusting an emission parameter of a laser in a WDM-PON according to the present disclosure. A combined optical power value is first obtained, then a tributary optical power value is obtained when a power value of output light of the laser is adjusted, and the power value of the output light and a power value of reflected light are obtained according to the combined optical power value and the tributary optical power value. The method includes the following steps.

Step 401: Split light in a second preset proportion from multiple pieces of reflected light obtained after multiple pieces of output light of the laser are reflected, to obtain multiple second optical signals, and receive the multiple second optical signals, to obtain through measurement power values of the multiple pieces of reflected light, where a power value of each piece of reflected light corresponds to a group of wavelength setting parameters.

Multiple different groups of wavelength setting parameters are input to a tunable laser, and each group of wavelength setting parameters drives the tunable laser to output light with different wavelengths when the system is started. Optical power values of the reflected light of the output light of the laser when the wavelength setting parameters are used are sequentially monitored. The reflected light is a part of output light that is emitted by a Faraday rotation mirror after the output light of the laser is transmitted through an optical multiplexer, where a polarization direction of the reflected light is perpendicular to that of the output light.

Step 401 gives an implementation manner of monitoring power of multiple pieces of reflected light, where a part of the multiple pieces of reflected light is received and power of the part of the multiple pieces of reflected light is measured, and the rest part of the multiple pieces of reflected light is transmitted to the laser and then shielded.

Step 402: Obtain a wavelength setting parameter corresponding to a maximum power value of the reflected light, as a wavelength calibration parameter.

Step 403: Calibrate a wavelength of output light of the laser according to the wavelength calibration parameter.

Steps 401, 402, and 403 are similar to the first possible implementation manner in Embodiment 2. For details, refer to the description of the first possible implementation manner, which are not described herein again.

Step 404: Split light in a first preset proportion from the output light of the laser as a first optical signal.

There are many methods for measuring the power of the output light of the laser, and a simple measurement method is described herein. Light in a first preset proportion is split from the output light as a first optical signal, and the rest of the output light is transmitted to the Faraday rotation mirror along an original transmission channel. The first preset proportion may be set according to an actual requirement, which is not limited herein. For example, the first preset proportion may be set between 5% and 10%. The first optical signal cannot be monitored easily when the first preset proportion is set to be excessively small, power of a link optical signal is affected when the first preset proportion set is set to be excessively large.

Step 405: Split light in a second preset proportion from the reflected light as a second optical signal.

The Faraday rotation mirror reflects back a part of the rest of the output light as the reflected light, and transmits the other part as a link optical signal and transmits data to a peer end in the system. Light in a second preset proportion is split from the reflected light as a second optical signal when the reflected light is returned to an ONU or OLT. The second preset proportion may be set according to an actual requirement, which is not further limited herein. For example, the second preset proportion may be set between 5% and 10%. The second optical signal cannot be monitored easily when the second preset proportion is set to be excessively small.

Step 406: Detect whether a polarization direction of the second optical signal is perpendicular to a polarization direction of the first optical signal. Perform step 407 if the second optical signal is perpendicular to the polarization direction of the first optical signal, and perform step 413 if the second optical signal is not perpendicular to the polarization direction of the first optical signal.

In the WDM-PON system, a polarization direction of the light that is reflected back is arbitrary if emitted light is reflected back before transmitted to the Faraday rotation mirror because a fiber break or another problem occurs in a transmission channel on which the output light of the laser is transmitted to the Faraday rotation mirror. However, a polarization direction of light reflected back by the Faraday rotation mirror is perpendicular to a polarization direction of the emitted light. Whether the polarization direction of the second optical signal is perpendicular to the polarization direction of the first optical signal is mainly detected to distinguish whether light that is reflected back is reflected light reflected back by the Faraday rotation mirror.

Step 407: Receive both the first optical signal and the second optical signal, to obtain a power sum of the first optical signal and the second optical signal as a combined optical power value.

The speed of light is fast, and in a process in which the output light of the laser is transmitted to the Faraday rotation mirror, the Faraday rotation mirror reflects back a part of the output light, and the reflected output light is used as the reflected light and then returned to the laser, a time interval between adjacent samples of a receiver is far greater than a latency between the output light and the reflected light. Therefore, the latency may be ignored. That is, a latency between the first optical signal and the second optical signal may be ignored. It may be considered that the first optical signal and the second optical signal are simultaneously received by the receiver, and a power sum of the first optical signal and the second optical signal is obtained as a combined optical power value.

Step 408: Shield the first optical signal or the second optical signal.

Step 409: Receive the unshielded second optical signal or the unshielded first optical signal, to obtain power of the unshielded second optical signal or the unshielded first optical signal as a tributary optical power value.

The tributary optical power value is a power value of the second optical signal when the first optical signal is shielded. The tributary optical power value is a power value of the first optical signal when the second optical signal is shielded.

Step 410: Obtain the power value of the output light and the power value of the reflected light according to the combined optical power value and the tributary optical power value.

Assuming that combined optical power is $P_1$, tributary optical power is $P_2$, the first preset proportion is $n_1$, and the second preset proportion is $n_2$ and when the first optical signal is shielded, the combined optical power value is the power sum of the first optical signal and the second optical signal, and the tributary power value is the power value of the second optical signal. The power value of the output light is calculated using a formula (2), and the power value of the reflected light is calculated using a formula (3):

$$P_{output} = \frac{P_1 - P_2}{n_1} \text{ and} \quad (2)$$

$$P_{reflect} = \frac{P_2}{n_2}. \quad (3)$$

The combined optical power value is the power sum of the first optical signal and the second optical signal, and the tributary optical power value is a power value of the first optical signal when the second optical signal is shielded. The power value of the output light is calculated using a formula (4), and the power value of the reflected light is calculated using a formula (5):

$$P_{output} = \frac{P_2}{n_1} \text{ and} \quad (4)$$

$$P_{reflect} = \frac{P_1 - P_2}{n_2}. \quad (5)$$

Step 411: Obtain an insertion loss value according to the power value of the output light, the power value of the reflected light, and a parameter of the Faraday rotation mirror, and obtain a bias current value according to the insertion loss value.

The insertion loss value is a power loss, of the output light of the laser, on a one-way link between the laser and the Faraday rotation mirror.

Step 412: Adjust the power value of the output light of the laser using the bias current value.

Step 411 and step 412 are similar to those in Embodiment 1. For details, refer to the description in Embodiment 1, which are not described herein again.

Step 413: Shield the second optical signal.

The second optical signal is not split from the reflected light reflected back by the Faraday rotation mirror when the polarization direction of the second optical signal is not perpendicular to the polarization direction of the first optical signal, but is an interference optical signal reflected back in another manner.

It should be noted herein that, a link optical signal transmitted from an ONU (OLT) in the WDM-PON system is also transmitted to the optical multiplexer using the Faraday rotation mirror, and then transmitted to an OLT (ONU) using a transmission fiber. The link optical signal may be identified on a transmission channel of the optical signal of the ONU (OLT), and the identified link optical signal is received.

It can be known from the foregoing content that, the present disclosure further has the following beneficial effects.

In this embodiment of the present disclosure, whether a second optical signal is split from reflected light reflected back by a Faraday rotation mirror may be distinguished by detecting whether a polarization state of the second optical signal is perpendicular to a polarization state of a first optical signal. Therefore, interference light can be shielded, power of the reflected light can be accurately monitored, and it can be ensured that an emission parameter of a laser is accurately adjusted.

Embodiment 4

Figure 5:
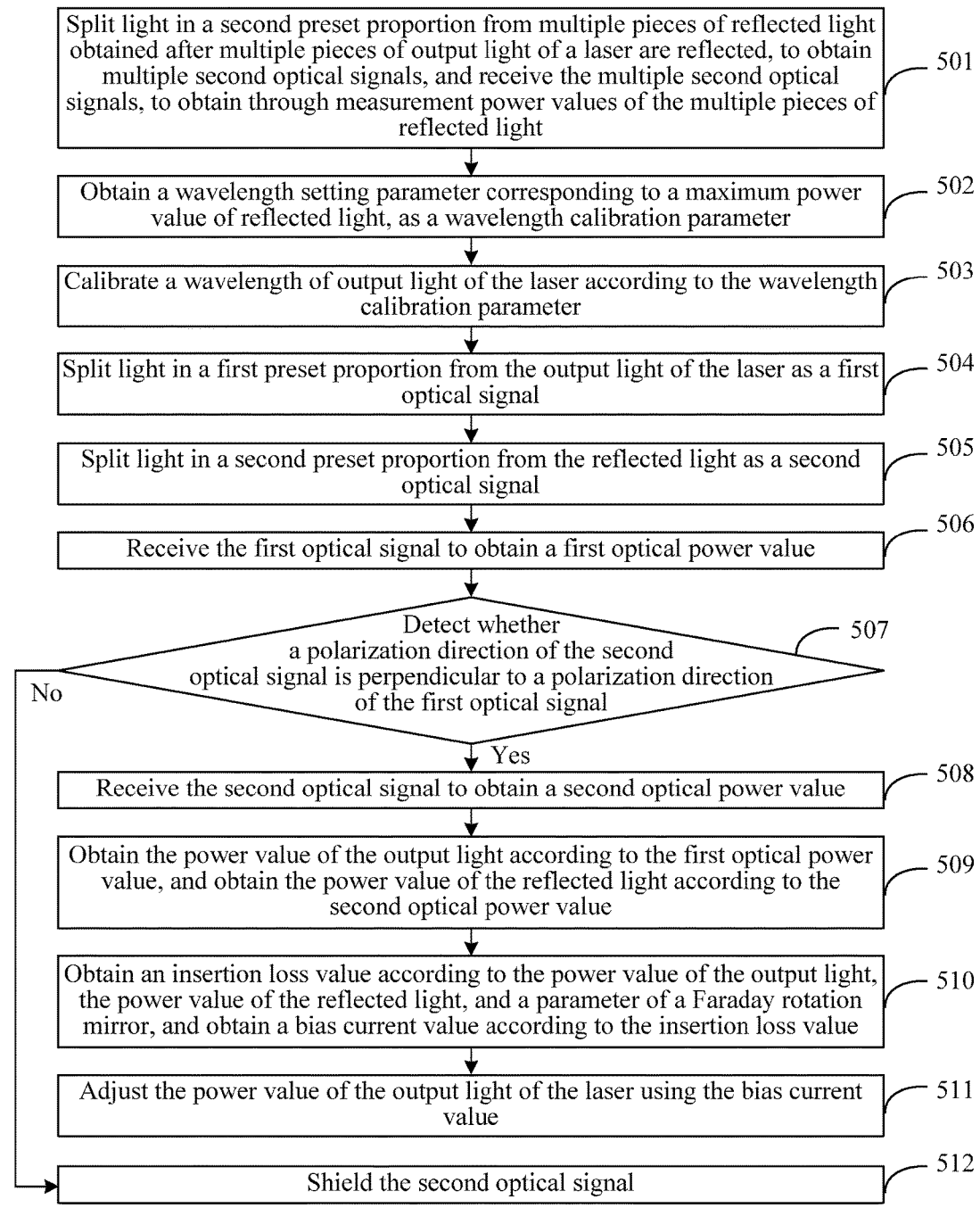
FIG. 5 is a flowchart of Embodiment 4 of a method for adjusting an emission parameter of a laser in a WDM-PON according to the present disclosure.

FIG. 5 is a flowchart of Embodiment 4 of a method for adjusting an emission parameter of a laser in a WDM-PON according to the present disclosure. The power value of the output light and a power value of reflected light are separately monitored when a power value of output light of the laser is adjusted. The method includes the following steps.

Step 501: Split light in a second preset proportion from multiple pieces of reflected light obtained after multiple pieces of output light of the laser are reflected, to obtain multiple second optical signals, and receive the multiple second optical signals, to obtain through measurement power values of the multiple pieces of reflected light, where a power value of each piece of reflected light corresponds to a group of wavelength setting parameters.

Multiple different groups of wavelength setting parameters are input to a tunable laser when the system is started, and each group of wavelength setting parameters drives the tunable laser to output light with different wavelengths. Optical power values of the reflected light of the output light of the laser when the wavelength setting parameters are used are sequentially monitored. The reflected light is a part of output light that is emitted by a Faraday rotation mirror after the output light of the laser is transmitted through an optical multiplexer, where a polarization direction of the reflected light is perpendicular to that of the output light.

Step 501 gives an implementation manner of monitoring power of multiple pieces of reflected light, where a part of the multiple pieces of reflected light is received to obtain through measurement the part of the multiple pieces of reflected light, and the rest part of the multiple pieces of reflected light is transmitted to the laser and then shielded.

Step 502: Obtain a wavelength setting parameter corresponding to a maximum power value of the reflected light, as a wavelength calibration parameter.

Step 503: Calibrate a wavelength of output light of the laser according to the wavelength calibration parameter.

Steps 501, 502 and, 503 are similar to the first possible implementation manner in Embodiment 2. For details, refer to the description of the first possible implementation manner, which are not described herein again.

Step 504: Split light in a first preset proportion from the output light of the laser as a first optical signal.

Step 505: Split light in a second preset proportion from the reflected light as a second optical signal.

Step 504 and step 505 are similar to those in Embodiment 3. For details, refer to the description in Embodiment 3, which are not described herein again.

Step 506: Receive the first optical signal to obtain a first optical power value.

Step 507: Detect whether a polarization direction of the second optical signal is perpendicular to a polarization direction of the first optical signal. Perform step 508 if the polarization direction of the second optical signal is perpendicular to the polarization direction of the first optical signal, and perform step 512 if the polarization direction of the second optical signal is not perpendicular to the polarization direction of the first optical signal.

Step 508: Receive the second optical signal to obtain a second optical power value.

In the WDM-PON system, a polarization direction of the light that is reflected back is arbitrary if emitted light is reflected back before transmitted to the Faraday rotation mirror because a fiber break or another problem occurs in a transmission channel on which the output light of the laser is transmitted to the Faraday rotation mirror. However, a polarization direction of light reflected back by the Faraday rotation mirror is perpendicular to a polarization direction of the output light. Whether the polarization direction of the second optical signal is perpendicular to the polarization direction of the first optical signal is mainly detected to distinguish whether light that is reflected back is reflected light reflected back by the Faraday rotation mirror.

The first optical signal is received using a photodiode to obtain a first optical power value, and the second optical signal is received using another photodiode to obtain a second optical power value when the polarization direction of the second optical signal is perpendicular to the polarization direction of the first optical signal.

Step 509: Obtain the power value of the output light according to the first optical power value, and obtain the power value of the reflected light according to the second optical power value.

Assuming that the first optical power value is $P_3$, the second optical power value is $P_4$, the first preset proportion is $n_3$, and the second preset proportion is $n_4$, the power value of the output light is calculated using a formula (6), and the power value of the reflected light is calculated using a formula (7):

$$P_{out} = \frac{P_3}{n_3} \text{ and} \quad (6)$$

$$P_{reflect} = \frac{P_4}{n_4}. \quad (7)$$

Step 510: Obtain an insertion loss value according to the power value of the output light, the power value of the reflected light, and a parameter of the Faraday rotation mirror, and obtain a bias current value according to the insertion loss value, where the insertion loss value is a power loss, of the output light of the laser, on a one-way link between the laser and the Faraday rotation mirror.

Step 511: Adjust the power value of the output light of the laser using the bias current value.

Step 510 and step 511 are similar to those in Embodiment 1. For details, refer to the description in Embodiment 1, which are not described herein again.

Step 512: Shield the second optical signal.

The second optical signal is not split from the reflected light reflected back by the Faraday rotation mirror when the polarization direction of the second optical signal is not perpendicular to the polarization direction of the first optical signal, but is an interference optical signal reflected back in another manner.

It should be noted herein that, a link optical signal transmitted from an ONU (OLT) in the WDM-PON system is also transmitted to the optical multiplexer using the Faraday rotation mirror, and then transmitted to an OLT (ONU) using a transmission fiber. The link optical signal may be identified on a transmission channel of the optical signal of the ONU (OLT), and the identified link optical signal is received.

Embodiment 5

Figure 6:
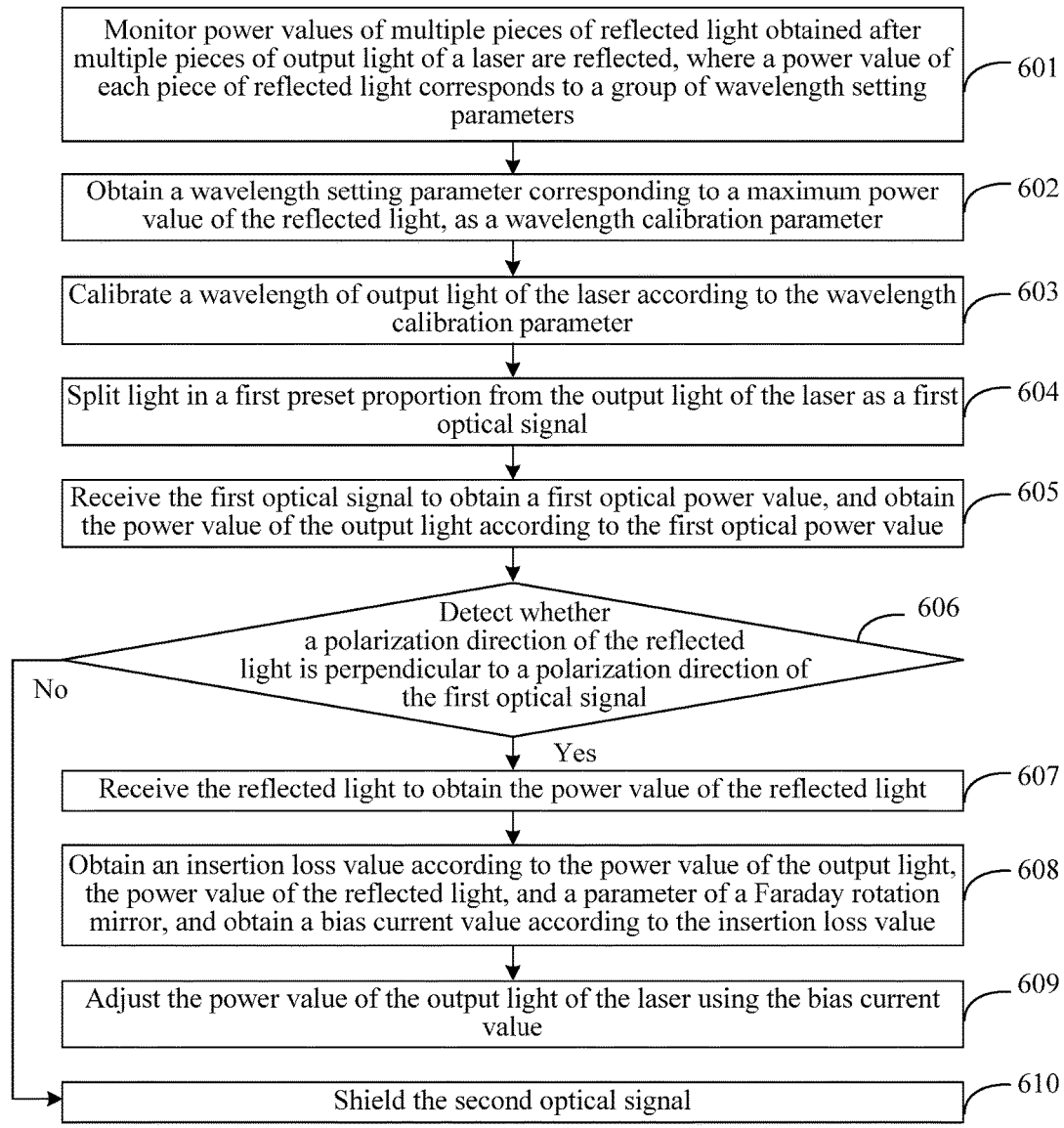
FIG. 6 is a flowchart of Embodiment 5 of a method for adjusting an emission parameter of a laser in a WDM-PON according to the present disclosure.

FIG. 6 is a flowchart of Embodiment 5 of a method for adjusting an emission parameter of a laser in a WDM-PON according to the present disclosure. Compared with Embodiment 4, in Embodiment 5, all reflected light is received to obtain power of the reflected light. The method includes the following steps.

Step 601: Monitor power values of multiple pieces of reflected light obtained after multiple pieces of output light of the laser are reflected, where a power value of each piece of reflected light corresponds to a group of wavelength setting parameters.

Step 602: Obtain a wavelength setting parameter corresponding to a maximum power value of the reflected light, as a wavelength calibration parameter.

Step 603: Calibrate a wavelength of output light of the laser according to the wavelength calibration parameter.

Steps 601, 602, and 603 are similar to the first possible implementation manner of calibrating a wavelength of a laser in Embodiment 2. For details, refer to the description of the first possible implementation manner in Embodiment 2, which are not described herein again.

Step 604: Split light in a first preset proportion from the output light of the laser as a first optical signal.

There are many methods for measuring the power of the output light of the laser, and a simple measurement method is further described herein. Light in a first preset proportion is split from the output light as a first optical signal, and the rest of the output light is transmitted to the Faraday rotation mirror along an original transmission channel. The first preset proportion may be set according to an actual requirement, which is not further limited herein. For example, the first preset proportion may be set between 5% and 10%. The first optical signal cannot be monitored easily when the first preset proportion is set to be excessively small, and power of a link optical signal is affected when the first preset proportion set is set to be excessively large.

Step 605: Receive the first optical signal to obtain a first optical power value, and obtain the power value of the output light according to the first optical power value.

Assuming that the first optical power value is $P_3$, and the first preset proportion is $n_3$, the power value of the output light is calculated using a formula (6):

$$P_{out} = \frac{P_3}{n_3}. \quad (6)$$

Step 606: Detect whether a polarization direction of the reflected light is perpendicular to a polarization direction of the first optical signal. Perform step 607 if the polarization direction of the reflected light is perpendicular to the polarization direction of the first optical signal, and perform step 610 if the polarization direction of the reflected light is not perpendicular to the polarization direction of the first optical signal.

In the WDM-PON system, a polarization direction of the light that is reflected back is arbitrary if emitted light is reflected back before transmitted to the Faraday rotation mirror because a fiber break or another problem occurs in a transmission channel on which the output light of the laser is transmitted to the Faraday rotation mirror. However, a polarization direction of light reflected back by the Faraday rotation mirror is perpendicular to a polarization direction of the output light. Whether the polarization direction of the reflected light is perpendicular to the polarization direction of the first optical signal is mainly detected to distinguish whether light that is reflected back is reflected light reflected back by the Faraday rotation mirror.

Step 607: Receive the reflected light to obtain the power value of the reflected light.

The reflected light is received using a photodiode and converted the reflected light into a current or voltage, and the power value of the reflected light is obtained according to the current or voltage when the polarization direction of the reflected light is perpendicular to the polarization direction of the first optical signal.

Step 608: Obtain an insertion loss value according to the power value of the output light, the power value of the reflected light, and a parameter of the Faraday rotation mirror, and obtain a bias current value according to the insertion loss value, where the insertion loss value is a power loss, of the output light of the laser, on a one-way link between the laser and the Faraday rotation mirror.

Step 609: Adjust the power value of the output light of the laser using the bias current value.

Steps 608, 609, and 610 are similar to those in Embodiment 1. For details, refer to the description in Embodiment 1, which are not described herein again.

Step 610: Shield the second optical signal.

The second optical signal is not split from the reflected light reflected back by the Faraday rotation mirror when the polarization direction of the second optical signal is not perpendicular to the polarization direction of the first optical signal, but is an interference optical signal reflected back in another manner.

It should be noted herein that, a link optical signal transmitted from an ONU (OLT) in the WDM-PON system is also transmitted to the optical multiplexer using the Faraday rotation mirror, and then transmitted to an OLT (ONU) using a transmission fiber. The link optical signal may be identified on a transmission channel of the optical signal of the ONU (OLT), and the identified link optical signal is received.

Embodiment 6

Figure 7:
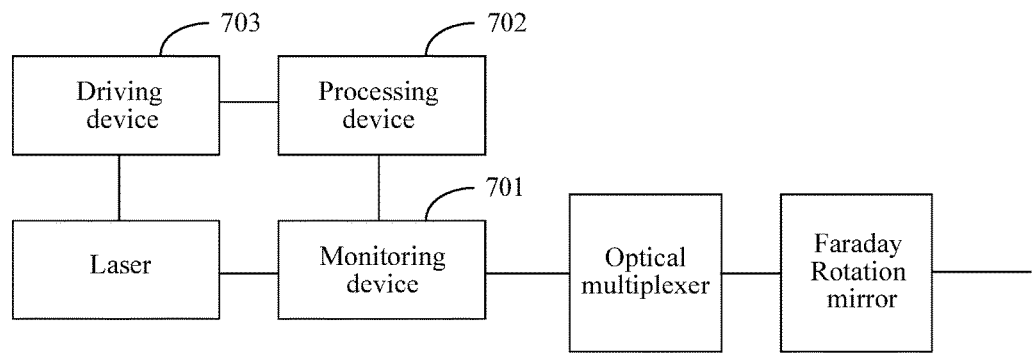
FIG. 7 is a schematic structural diagram of Embodiment 6 of an apparatus for adjusting an emission parameter of a laser in a WDM-PON according to the present disclosure.

FIG. 7 is a schematic structural diagram of Embodiment 3 of an apparatus for adjusting an emission parameter of a laser in a WDM-PON according to the present disclosure.

The apparatus of Embodiment 6 corresponds to the method of Embodiment 1. The apparatus includes a monitoring device 701, a processing device 702, and a driving device 703.

The monitoring device 701 is configured to monitor a power value of output light of the laser and a power value of reflected light, where the reflected light is light reflected back by a Faraday rotation mirror when the output light passes through the Faraday rotation mirror.

The monitoring device 701 is mainly configured to measure the power value of the output light and the power value of the reflected light. The monitoring device 701 receives the output light of the laser and the reflected light, converts the output light and the reflected light into current or voltage signals, to obtain through measurement the power value of the output light and the power value of the reflected light according to the current or voltage signal. A larger current or voltage into which the output light or the reflected light is converted indicates a larger power value of the output light or the reflected light.

The monitoring device 701 includes a photodiode for receiving the output light and the reflected light. The monitoring device 701 may directly measure the power value of the output light and the power value of the reflected light, or may receive a part of the output light and the reflected light according to a preset proportion to obtain the power value of the output light and the power value of the reflected light. In subsequent embodiments, different measurement methods are described in detail.

The processing device 702 is configured to obtain an insertion loss value according to the power value of the output light, the power value of the reflected light, and a parameter of the Faraday rotation mirror, and obtain a bias current value according to the insertion loss value, where the insertion loss value is a power loss, of the output light of the laser, on a one-way link between the laser and the Faraday rotation mirror.

Optionally, the processing device 702 includes a first query unit configured to query a first pre-configured file, where the first pre-configured file includes a correspondence between a bias current of the laser and the insertion loss value, of the output light of the laser, on the one-way link between the laser and the Faraday rotation mirror, and a first obtaining unit configured to obtain, in the first pre-configured file, the bias current value corresponding to the insertion loss value.

Optionally, the processing device further 702 includes a calculation unit configured to calculate a fiber length of the one-way link between the laser and the Faraday rotation mirror according to the insertion loss value, a second query unit configured to query a second pre-configured file, where the second pre-configured file includes a correspondence between the fiber length and a bias current of the laser, and a second obtaining unit configured to obtain, in the second pre-configured file, the bias current value corresponding to the fiber length.

The description herein corresponds to the first possible implementation manner and the second possible implementation manner of obtaining a bias current value according to the insertion loss value in Embodiment 1. For details, refer to the description in Embodiment 1, which are not described herein again.

The driving device 703 is configured to adjust the power value of the output light of the laser using the bias current value.

The description herein is similar to that of Embodiment 1. For details, refer to the description in Embodiment 1, which are not described herein again.

In actual application, the apparatus further includes a wavelength division multiplexer and a link signal receiver, where the wavelength division multiplexer is configured to identify and reflect a link optical signal, and the link signal receiver is configured to receive the link optical signal. Further, a photodiode may be used as the link signal receiver.

Embodiment 7

Figure 8:
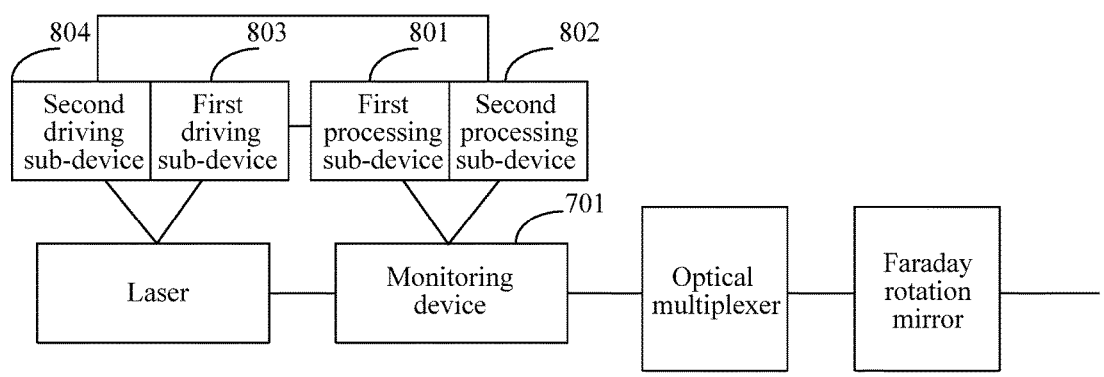
FIG. 8 is a schematic structural diagram of Embodiment 7 of an apparatus for adjusting an emission parameter of a laser in a WDM-PON according to the present disclosure.

FIG. 8 is a schematic structural diagram of Embodiment 4 of an apparatus for adjusting an emission parameter of a laser in a WDM-PON according to the present disclosure. The apparatus of Embodiment 7 corresponds to the method of Embodiment 2. The apparatus includes a monitoring device 701, a processing device, and a driving device.

The monitoring device 701 is configured to monitor power values of multiple pieces of reflected light obtained after multiple pieces of output light of the laser are reflected when a wavelength of output light of the laser is calibrated, where a power value of each piece of reflected light corresponds to a group of wavelength setting parameters, and configured to monitor a power value of the output light of the laser and a power value of reflected light when power of the output light of the laser is adjusted, where the reflected light is light reflected back by a Faraday rotation mirror when the output light passes through the Faraday rotation mirror.

The processing device includes a first processing sub-device 801 and a second processing sub-device 802, where the first processing sub-device 801 is configured to obtain a wavelength setting parameter corresponding to a maximum power value of the reflected light, as a wavelength calibration parameter when the wavelength of the output light of the laser is calibrated, and the second processing sub-device 802 is configured to obtain an insertion loss value according to the power value of the output light, the power value of the reflected light, and a parameter of the Faraday rotation mirror when the power of the output light of the laser is adjusted, and obtain a bias current value according to the insertion loss value, where the insertion loss value is a power loss, of the output light of the laser, on a one-way link between the laser and the Faraday rotation mirror.

The driving device includes a first driving sub-device 803 and a second driving sub-device 804, where the first driving sub-device 803 is configured to calibrate the wavelength of the output light of the laser according to the wavelength calibration parameter when the wavelength of the output light of the laser is calibrated, and the second driving sub-device 804 is configured to adjust the power of the output light of the laser using the bias current value when the power of the output light of the laser is adjusted.

It should be noted herein that, the first processing sub-device 801 and the second processing sub-device 802 may be different software processing programs integrated in a same hardware processing device, or may be two different hardware processing devices. The first driving sub-device 803 and the second driving sub-device 804 may be integrated in different software driving programs in a same hardware driving device, or may be two different hardware driving devices. Setting may be performed according to an actual situation, which is not limited herein.

It should be noted herein that, in all of Embodiment 8 to Embodiment 13, an apparatus for adjusting an emission parameter of a laser is described in detail, and the apparatus may implement wavelength calibration on output light of the laser and power adjustment on the output light. In Embodiment 2, two possible implementation manners of wavelength calibration are further described, and in all of Embodiment 8 to Embodiment 13, a first possible implementation manner is used as an example for description, and a second possible implementation manner is also applicable, which is not described again.

Embodiment 8

Figure 9:
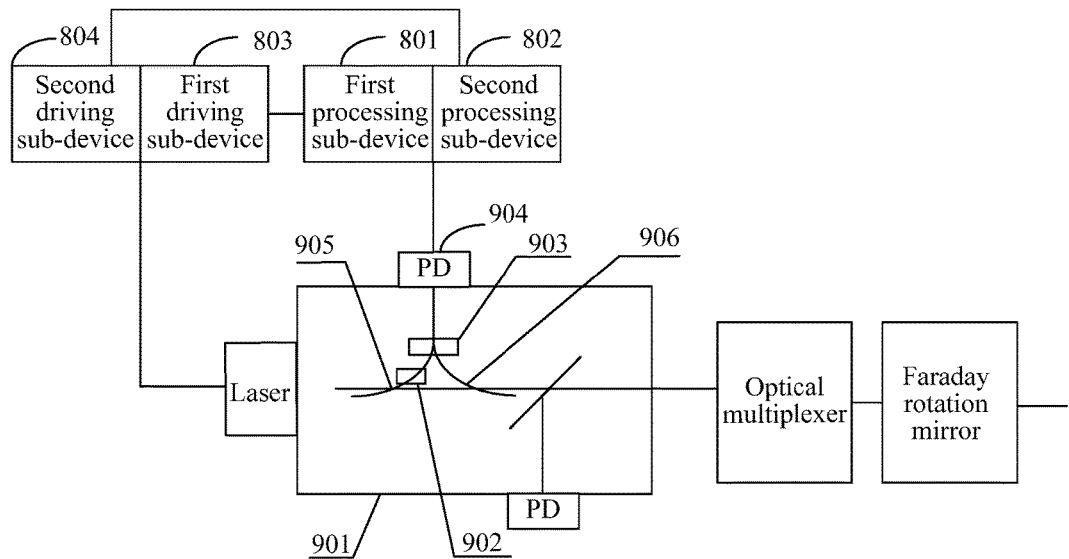
FIG. 9 is a schematic structural diagram of Embodiment 8 of an apparatus for adjusting an emission parameter of a laser in a WDM-PON according to the present disclosure.

FIG. 9 is a schematic structural diagram of Embodiment 8 of an apparatus for adjusting an emission parameter of a laser in a WDM-PON according to the present disclosure. The system of Embodiment 8 corresponds to the method of Embodiment 3, where a power value of output light of the laser and a power value of reflected light are monitored using a photodiode. The apparatus includes a monitoring device, including a planar optical waveguide 901, a variable optical attenuator 902, a polarization beam splitter 903, and a first photodiode 904.

Two optical splitting grooves 905 and 906 are engraved on the planar optical waveguide 901, the variable optical attenuator 902 is disposed on either optical splitting groove, and the polarization beam splitter 903 is disposed at an intersection of the two optical splitting grooves 905 and 906.

The variable optical attenuator 902 may be disposed on the optical splitting groove 905, or may be disposed on the optical splitting groove 906, and the variable optical attenuator 902 may be adjusted, to shield an optical signal transmitted on the optical splitting groove on which the variable optical attenuator 902 is disposed.

When a wavelength of the output light of the laser is calibrated:

The second optical splitting groove 906 is configured to split light in a second preset proportion from reflected light of multiple pieces of output light of the laser to obtain multiple second optical signals.

The second optical splitting groove 906 splits light in a second preset proportion from multiple pieces of reflected light obtained after multiple pieces of output light of the laser are reflected, to obtain multiple second optical signals, and transmits the multiple second optical signals to the first photodiode 904 such that the first photodiode 904 receives the multiple second optical signals.

The polarization beam splitter 903 is configured to detect whether polarization directions of the multiple second optical signals are perpendicular to a polarization direction of the output light, and transmit the multiple second optical signals whose polarization directions are perpendicular to the polarization direction of the output light.

Because light that is reflected back may be caused by a fiber break or another reason, and light reflected back by a broken fiber is not reflected light reflected back by the Faraday rotation mirror, interference light caused by a fiber break or another reason needs to be shielded. A polarization direction of the reflected light reflected back by the Faraday rotation mirror is perpendicular to a polarization direction of emitted light, that is, the polarization direction of the second optical signal is perpendicular to the polarization direction of the output light. However, a polarization direction of interference light that is reflected back and that is caused by a fiber break or another reason is arbitrary. In this case, the polarization direction of the second optical signal is not perpendicular to the polarization direction of the output light.

The variable optical attenuator 902 is configured to shield the first optical signal obtained by splitting light in a first preset proportion from the output light of the laser.

The first photodiode 904 is configured to receive the multiple second optical signals, to obtain through measurement power values of the multiple pieces of reflected light when the polarization directions of the multiple second optical signals are perpendicular to the polarization direction of the output light, where a power value of each piece of reflected light corresponds to a group of wavelength setting parameters.

The first processing sub-device 801 is configured to obtain a wavelength setting parameter corresponding to a maximum power value of the reflected light, as a wavelength calibration parameter when the wavelength of the output light of the laser is calibrated.

The first driving sub-device 803 is configured to calibrate the wavelength of the output light of the laser according to the wavelength calibration parameter when the wavelength of the output light of the laser is calibrated.

Multiple different groups of wavelength setting parameters are input to a tunable laser, and each group of wavelength setting parameters drives the tunable laser to output light with different wavelengths when the system is started. The output light with different wavelengths is transmitted to an optical multiplexer using the planar waveguide 901, the light transmitted by the optical multiplexer is input to a Faraday rotation mirror disposed at a common port of the optical multiplexer, and a part of the output light reflected back by the Faraday rotation mirror is used as reflected light and reflected back to the planar optical waveguide, where a polarization direction of the reflected light is perpendicular to a polarization direction of the output light. Light in a second preset proportion is split by the second optical splitting groove 906 of the planar optical waveguide from the pieces of reflected light input to the planar optical waveguide, as second optical signals. Multiple second optical signals are received to obtain through measurement power values of reflected light of the laser when multiple different wavelength setting parameters are used. When the reflected light has a maximum power value, the wavelength of the output light of the laser is a transmission wavelength of a distribution port of the optical multiplexer, a wavelength setting parameter corresponding to the power value of the reflected light is a wavelength calibration parameter, and the wavelength of the output light of the laser is calibrated according to the wavelength calibration parameter.

When power of the output light of the laser is adjusted:

The first optical splitting groove 905 is configured to split light in a first preset proportion from the output light of the laser as a first optical signal.

The second optical splitting groove 906 is configured to split light in a second preset proportion from the reflected light of the output light of the laser as a second optical signal.

The first optical splitting groove 905 splits a part of the output light of the laser as a first optical signal, and transmits the first optical signal to the first photodiode 904 such that the first photodiode 904 receives the first optical signal.

The second optical splitting groove 906 splits a part of the reflected light of the laser as a second optical signal, and transmits the second optical signal to the first photodiode 904 such that the first photodiode 904 receives the second optical signal.

The polarization beam splitter 903 is configured to detect whether the polarization direction of the second optical signal is perpendicular to the polarization direction of the first optical signal, and transmit the first optical signal and the second optical signal whose polarization direction is perpendicular to the polarization direction of the first optical signal.

The polarization directions of the first optical signal and the second optical signal are detected using the polarization beam splitter 903. Only the second optical signal whose polarization direction is perpendicular to the polarization direction of the first optical signal can be transmitted. In this case, the second optical signal is obtained by splitting light from the reflected light reflected back by the Faraday rotation mirror.

The variable optical attenuator 902 is configured to shield the first optical signal or the second optical signal transmitted on the optical splitting groove in which the variable optical attenuator 902 is located.

The variable optical attenuator 902 may be disposed on either optical splitting groove. The variable optical attenuator 902 may be adjusted to shield the first optical signal on the first optical splitting groove 905 when the variable optical attenuator 902 is disposed on the first optical splitting groove 905. In this case, the first photodiode 904 can only receive the second optical signal transmitted on the second optical splitting groove 906. The variable optical attenuator 902 may be adjusted to shield the second optical signal on the second optical splitting groove 906 when the variable optical attenuator 902 is disposed on the second optical splitting groove 906,. In this case, the first photodiode 904 can only receive the first optical signal transmitted on the first optical splitting groove 905.

The first photodiode 904 is configured to receive both the first optical signal and the second optical signal, to obtain a power sum of the first optical signal and the second optical signal as a combined optical power value when the polarization direction of the second optical signal is perpendicular to the polarization direction of the first optical signal, receive the unshielded second optical signal or the unshielded first optical signal, to obtain power of the unshielded second optical signal or the unshielded first optical signal as a tributary optical power value, and obtain the power value of the output light and the power value of the reflected light according to the combined optical power value and the tributary optical power value.

The first photodiode 904 first receives both the first optical signal and the second optical signal, to obtain a power sum of the first optical signal and the second optical signal as a combined optical power value. The first photodiode 904 then receives only the second optical signal transmitted on the second optical splitting groove 906, to obtain the power value of the second optical signal as a tributary optical power value when the variable optical attenuator 902 is disposed on the first optical splitting groove 905. The first photodiode 904 then receives only the first optical signal transmitted on the first optical splitting groove 905, to obtain the power value of the first optical signal as a tributary optical power value when the variable optical attenuator 902 is disposed on the second optical splitting groove 906.

Obtaining the power value of the output light and the power value of the reflected light according to the combined optical power value and the tributary optical power value is similar to that in Embodiment 3. For details, refer to the description in Embodiment 3, which are not described herein again.

The second processing sub-device 802 is configured to obtain an insertion loss value according to the power value of the output light, the power value of the reflected light, and a parameter of the Faraday rotation mirror when the power of the output light of the laser is adjusted, and obtain a bias current value according to the insertion loss value.

The insertion loss value is a power loss, of the output light of the laser, on a one-way link between the laser and the Faraday rotation mirror.

The second driving sub-device 804 is configured to adjust the power of the output light of the laser using the bias current value when the power of the output light of the laser is adjusted.

A method for adjusting power of output light of a laser is similar to that of Embodiment 3. For details, refer to the description in Embodiment 3, which are not described herein again.

Embodiment 9

Figure 10:
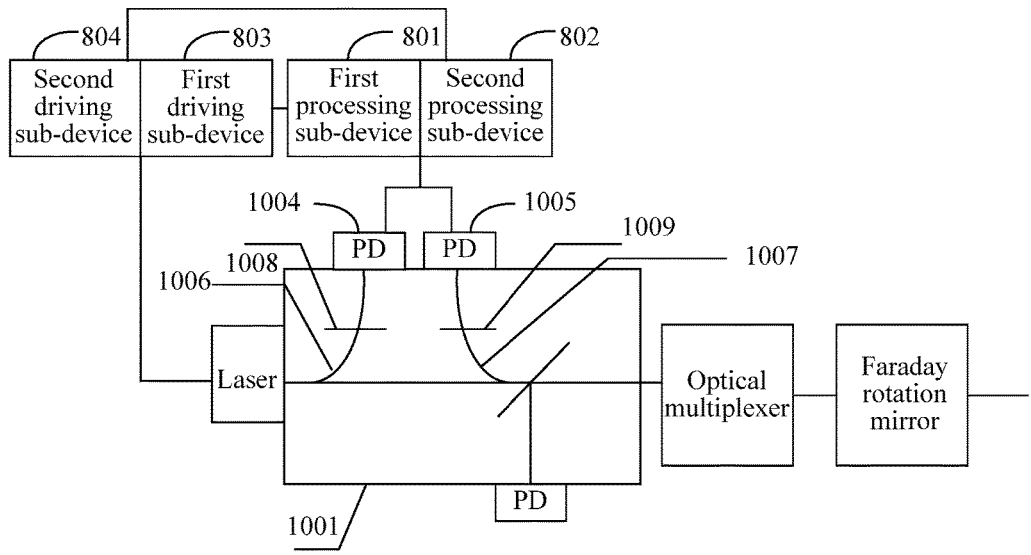
FIG. 10 is a schematic structural diagram of Embodiment 9 of an apparatus for adjusting an emission parameter of a laser in a WDM-PON according to the present disclosure.

FIG. 10 is a schematic structural diagram of Embodiment 9 of an apparatus for adjusting an emission parameter of a laser in a WDM-PON according to the present disclosure. The apparatus of Embodiment 9 corresponds to the method of Embodiment 4. Light splitting is performed using a planar optical waveguide, and a power value of output light of the laser and a power value of reflected light are separately monitored using two photodiodes. The system includes a monitoring device, including a planar optical waveguide 1001, a second photodiode 1004, and a third photodiode 1005.

Two optical splitting grooves 1006 and 1007 are engraved on the planar optical waveguide, where each optical splitting groove is provided with one polarization detector.

A first polarization detector 1008 is disposed on the first optical splitting groove 1006, and a second polarization detector 1009 is disposed on the second optical splitting groove 1007.

When a wavelength of the output light of the laser is calibrated:

The second optical splitting groove 1007 is configured to split light in a second preset proportion from multiple pieces of reflected light obtained after multiple pieces of output light of the laser are reflected, to obtain multiple second optical signals.

The second optical splitting groove 1007 splits a part of the reflected light obtained after the multiple pieces of output light of the laser are reflected, to obtain multiple second optical signals, and transmits the multiple second optical signals to the third photodiode 1005 such that the third photodiode 1005 receives the multiple second optical signals.

The polarization detector 1009 is configured to detect whether polarization directions of the multiple second optical signals are perpendicular to a polarization direction of the output light. Only the second optical signal whose polarization direction is perpendicular to the polarization direction of the output light can be transmitted.

The third photodiode 1005 is configured to receive the multiple second optical signals, to obtain through measurement power values of the multiple pieces of reflected light when the polarization directions of the multiple second optical signals are perpendicular to the polarization direction of the output light, where a power value of each piece of reflected light corresponds to a group of wavelength setting parameters.

The first processing sub-device 801 is configured to obtain a wavelength setting parameter corresponding to a maximum power value of the reflected light, as a wavelength calibration parameter when the wavelength of the output light of the laser is calibrated.

The first driving sub-device 803 is configured to calibrate the wavelength of the output light of the laser according to the wavelength calibration parameter when the wavelength of the output light of the laser is calibrated.

Multiple different groups of wavelength setting parameters are input to a tunable laser, and each group of wavelength setting parameters drives the tunable laser to output light with different wavelengths when the system is started. The output light with different wavelengths is transmitted to an optical multiplexer using the planar waveguide 1001, the light transmitted by the optical multiplexer is input to a Faraday rotation mirror disposed at a common port of the optical multiplexer, and a part of the output light reflected back by the Faraday rotation mirror is used as reflected light and reflected back to the planar optical waveguide, where a polarization direction of the reflected light is perpendicular to a polarization direction of the output light. Light in a second preset proportion is split by the second optical splitting groove 1007 of the planar optical waveguide 1001 from the pieces of reflected light input to the planar optical waveguide as second optical signals. Multiple second optical signals are received to obtain through measurement power values of reflected light of the laser when multiple different groups of wavelength setting parameters are used. The wavelength of the output light of the laser is a transmission wavelength of a distribution port of the optical multiplexer, a wavelength setting parameter corresponding to the power value of the reflected light is a wavelength calibration parameter, and the wavelength of the output light of the laser is calibrated according to the wavelength calibration parameter when the reflected light has a maximum power value.

When power of the output light of the laser is adjusted:

The first optical splitting groove 1006 is configured to split light in a first preset proportion from the output light of the laser as a first optical signal.

The second optical splitting groove 1007 is configured to split light in a second preset proportion from the reflected light of the output light of the laser as a second optical signal.

The two polarization detectors 1008 and 1009 are configured to detect whether the polarization direction of the second optical signal is perpendicular to the polarization direction of the first optical signal, where each polarization detector can only transmit an optical signal in a preset polarization direction.

The first polarization detector 1008 disposed on the first optical splitting groove 1006 is configured to transmit the first optical signal obtained by splitting light from the output light of the laser, and a polarization direction preset by the first polarization detector 1008 is consistent with the polarization direction of the output light. The second polarization detector 1009 disposed on the second optical splitting groove 1007 is configured to transmit the second optical signal obtained by splitting light from the reflected light of the output light of the laser, and a polarization direction preset by the second polarization detector 1009 is consistent with the polarization direction of the reflected light. The polarization direction of the output light is perpendicular to the polarization direction of the reflected light. The second optical signal is shielded by the second polarization detector 1009, and cannot be transmitted when the second optical signal is an optical signal obtained by splitting light from light reflected back due to a problem such as a fiber break, because a polarization direction of the light reflected back due to a problem such as a fiber break is arbitrary.

The second photodiode 1004 is configured to receive the first optical signal to obtain a first optical power value, and obtain the power value of the output light according to the first optical power value.

The third photodiode 1005 is configured to receive the second optical signal to obtain the second optical power value, and obtain the power value of the reflected light according to the second optical power value when the polarization direction of the second optical signal is perpendicular to the polarization direction of the first optical signal.

The first optical signal is received by the second photodiode 1004, and the second optical signal is received by the third photodiode 1005, to separately obtain through measurement the first optical power value of the first optical signal and the second optical power value of the second optical signal, the power value of the output light is obtained according to the first optical power value, and the power value of the reflected light is obtained according to the second optical power value. For details, refer to the description in Embodiment 4, which are not described herein again.

It should be noted herein that, the two polarization detectors 1008 and 1009 may be two polarization analyzers, or may be two polarization beam splitters, or one of them may be a polarization analyzer, and the other is a polarization beam splitter. Setting may be performed according to actual application, which is not further limited herein.

The second processing sub-device 802 is configured to obtain an insertion loss value according to the power value of the output light, the power value of the reflected light, and a parameter of the Faraday rotation mirror, and obtain a bias current value according to the insertion loss value when the power of the output light of the laser is adjusted.

The insertion loss value is a power loss, of the output light of the laser, on a one-way link between the laser and the Faraday rotation mirror.

The second driving sub-device 804 is configured to adjust the power of the output light of the laser using the bias current value when the power of the output light of the laser is adjusted.

A method for adjusting power of output light of a laser is similar to that of Embodiment 4. For details, refer to the description in Embodiment 4, which are not described herein again.

Embodiment 10

Figure 11:
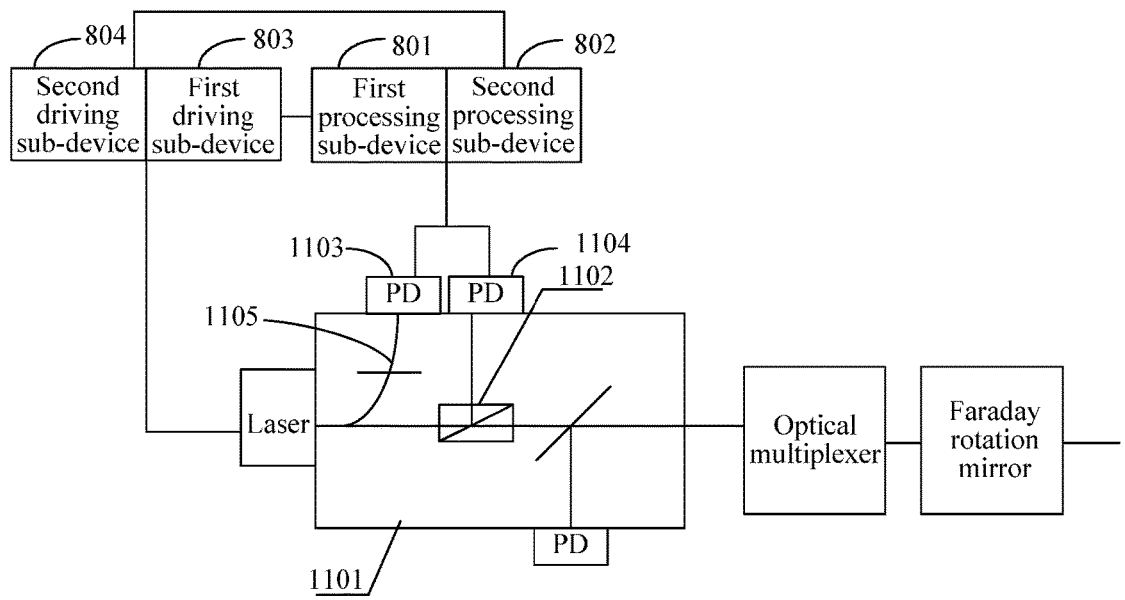
FIG. 11 is a schematic structural diagram of Embodiment 10 of an apparatus for adjusting an emission parameter of a laser in a WDM-PON according to the present disclosure.

FIG. 11 is a schematic structural diagram of Embodiment 10 of an apparatus for adjusting an emission parameter of a laser in a WDM-PON according to the present disclosure. The apparatus of Embodiment 10 corresponds to the method of Embodiment 5. Output light of the laser is split using a planar optical waveguide, and reflected light is all received. The apparatus includes a monitoring device, including a planar optical waveguide 1101, a polarization beam splitter 1102, a fourth photodiode 1103, and a fifth photodiode 1104, where the polarization beam splitter 1102 is disposed on a transmission channel of the output light.

When a wavelength of the output light of the laser is calibrated:

The polarization beam splitter 1102 is configured to detect whether polarization directions of multiple pieces of reflected light obtained after multiple pieces of output light of the laser are reflected are perpendicular to a polarization direction of the output light, and transmit the multiple pieces of reflected light whose polarization directions are perpendicular to the polarization direction of the output light.

The polarization beam splitter 1102 may transmit an optical signal in a preset polarization direction, and can only transmit light whose polarization direction is perpendicular to the polarization direction of the output light. In this way, it can be ensured that the received reflected light is a part of output light that is reflected back by a Faraday rotation mirror rather than light reflected back due to a fiber break or another reason.

The fifth photodiode 1104 is configured to receive the multiple pieces of reflected light transmitted by the polarization beam splitter, to obtain power values of the multiple pieces of reflected light when the polarization directions of the multiple pieces of reflected light are perpendicular to the polarization direction of the output optical signal, where a power value of each piece of reflected light corresponds to a group of wavelength setting parameters.

The first processing sub-device 801 is configured to obtain a wavelength setting parameter corresponding to a maximum power value of the reflected light, as a wavelength calibration parameter when the wavelength of the output light of the laser is calibrated.

The first driving sub-device 803 is configured to calibrate the wavelength of the output light of the laser according to the wavelength calibration parameter when the wavelength of the output light of the laser is calibrated.

Multiple different groups of wavelength setting parameters are input to a tunable laser, and each group of wavelength setting parameters drives the tunable laser to output optical signals with different wavelengths when the system is started. The output light with different wavelengths is transmitted to an optical multiplexer using the planar waveguide 1101, the light transmitted by the optical multiplexer is input to a Faraday rotation mirror disposed at a common port of the optical multiplexer, and a part of the output light reflected back by the Faraday rotation mirror is used as reflected light and reflected back to the planar optical waveguide, where a polarization direction of the reflected light is perpendicular to a polarization direction of the output light. The pieces of reflected light input to the planar optical waveguide are transmitted to the fifth photodiode 1104 using the polarization beam splitter 1102. The fifth photodiode 1104 measures power values of reflected light when multiple different wavelength setting parameters are used. The wavelength of the output light of the laser is a transmission wavelength of a distribution port of the optical multiplexer, a wavelength setting parameter corresponding to the power value of the reflected light is a wavelength calibration parameter, and the wavelength of the output light of the laser is calibrated according to the wavelength calibration parameter when the reflected light has a maximum power value.

When power of the output light of the laser is adjusted:

One optical splitting groove 1105 is engraved on the planar optical waveguide 1101, where the optical splitting groove 1105 is configured to split light in a first preset proportion from the output light of the laser as a first optical signal.

The polarization beam splitter 1102 is configured to detect whether a polarization direction of the reflected light obtained after the output light of the laser is reflected is perpendicular to a polarization direction of the first optical signal, and transmit the reflected light whose polarization direction is perpendicular to the polarization direction of the first optical signal.

A polarization direction preset by the polarization beam splitter 1102 is perpendicular to the polarization direction of the first optical signal, and the polarization beam splitter 1102 can only transmit the reflected light reflected back by the Faraday rotation mirror. Because a polarization direction of light reflected back due to a problem such as a fiber break is arbitrary, the light is shielded by the polarization beam splitter 1102, and cannot be transmitted.

The fourth photodiode 1103 is configured to receive the first optical signal to obtain a first optical power value, and obtain the power value of the output light according to the first optical power value.

The fifth photodiode 1104 is configured to receive the reflected light transmitted from the polarization beam splitter, to obtain the power value of the reflected light when the polarization direction of the reflected light is perpendicular to the polarization direction of the first optical signal.

The first optical signal is received by the fourth photodiode 1103 to obtain through measurement the first optical power value of the first optical signal. The power value of the output light is obtained according to the first optical power value. For details, refer to the description in Embodiment 5, which are not described herein again.

The second processing sub-device 802 is configured to obtain an insertion loss value according to the power value of the output light, the power value of the reflected light, and a parameter of the Faraday rotation mirror, and obtain a bias current value according to the insertion loss value when the power of the output light of the laser is adjusted.

The insertion loss value is a power loss, of the output light of the laser, on a one-way link between the laser and the Faraday rotation mirror.

The second driving sub-device 804 is configured to adjust the power of the output light of the laser using the bias current value when the power of the output light of the laser is adjusted.

A method for adjusting power of output light of a laser is similar to that of Embodiment 5. For details, refer to the description in Embodiment 5, which are not described herein again.

Embodiment 11

Figure 12:
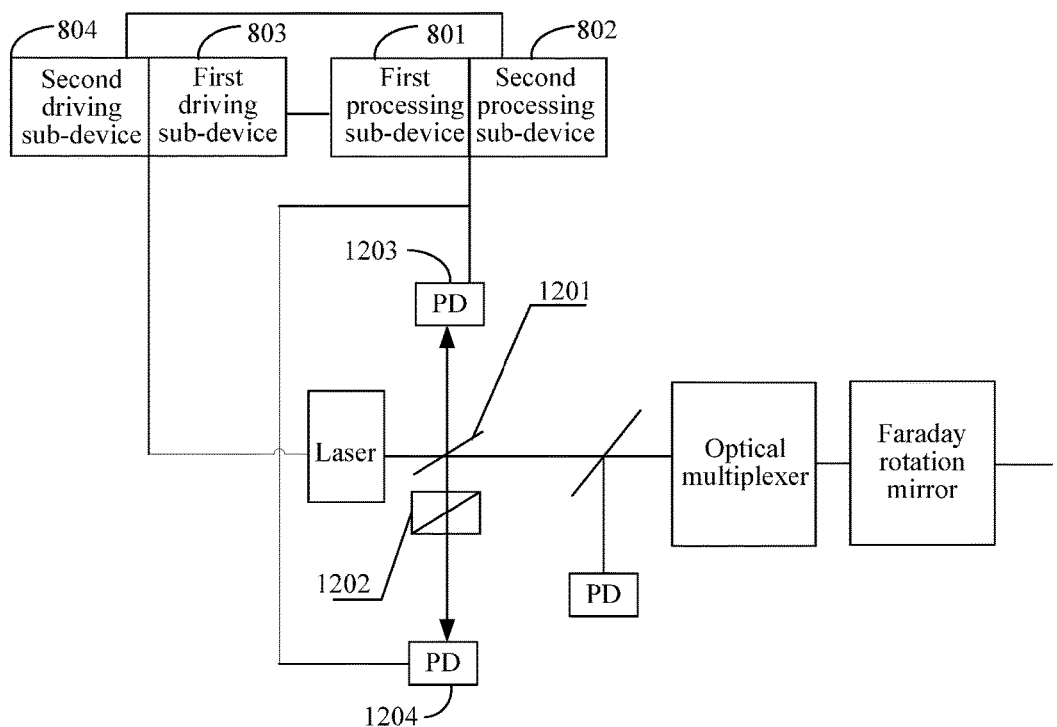
FIG. 12 is a schematic structural diagram of Embodiment 11 of an apparatus for adjusting an emission parameter of a laser in a WDM-PON according to the present disclosure.

FIG. 12 is a schematic structural diagram of Embodiment 11 of an apparatus for adjusting an emission parameter of a laser in a WDM-PON according to the present disclosure. The apparatus of Embodiment 11 corresponds to the method of Embodiment 5. Output light of the laser is split using a partial reflector, and reflected light is reflected to a polarization detector. The apparatus includes a monitoring device, including a partial reflector 1201, a polarization detector 1202, a sixth photodiode 1203, and a seventh photodiode 1204, where the polarization detector 1202 is a polarization analyzer or a polarization beam splitter.

When a wavelength of the output light of the laser is calibrated:

The partial reflector 1201 is configured to reflect multiple pieces of reflected light of multiple pieces of output light of the laser to the polarization detector 1202.

The polarization detector 1202 is configured to detect whether polarization directions of the multiple pieces of reflected light are perpendicular to a polarization direction of the output light, and transmit the multiple pieces of reflected light whose polarization directions are perpendicular to the polarization direction of the output light.

The polarization detector 1202 may transmit an optical signal in a preset polarization direction, and can only transmit light whose polarization direction is perpendicular to the polarization direction of the output light. In this way, it can be ensured that the received multiple pieces of reflected light are a part of output light that is reflected back by a Faraday rotation mirror rather than light reflected back due to a fiber break or another reason.

The seventh photodiode 1204 is configured to receive the multiple pieces of reflected light transmitted from the polarization detector, to obtain power values of the multiple pieces of reflected light when the polarization directions of the multiple pieces of reflected light are perpendicular to the polarization direction of the output light, where a power value of each piece of reflected light corresponds to a group of wavelength setting parameters.

The first processing sub-device 801 is configured to obtain a wavelength setting parameter corresponding to a maximum power value of the reflected light, as a wavelength calibration parameter when the wavelength of the output light of the laser is calibrated.

The first driving sub-device 803 is configured to calibrate the wavelength of the output light of the laser according to the wavelength calibration parameter when the wavelength of the output light of the laser is calibrated.

Multiple different groups of wavelength setting parameters are input to a tunable laser, and each group of wavelength setting parameters drives the tunable laser to output optical signals with different wavelengths when the system is started. The output light with different wavelengths is transmitted to an optical multiplexer, the light transmitted by the optical multiplexer is input to a Faraday rotation mirror disposed at a common port of the optical multiplexer, and a part of the output light reflected back by the Faraday rotation mirror is used as reflected light and reflected back to the planar optical waveguide, where a polarization direction of the reflected light is perpendicular to a polarization direction of the output light. The pieces of reflected light input to the planar optical waveguide are transmitted to the seventh photodiode 1204 using the polarization detector 1202. The seventh photodiode 1204 measures power values of reflected light when multiple different wavelength setting parameters are used. The wavelength of the output light of the laser is a transmission wavelength of a distribution port of the optical multiplexer, a wavelength setting parameter corresponding to the power value of the reflected light is a wavelength calibration parameter, and the wavelength of the output light of the laser is calibrated according to the wavelength calibration parameter when the reflected light has a maximum power value.

When power of the output light of the laser is adjusted:

The partial reflector 1201 is configured to split light in a first preset proportion from the output light of the laser as a first optical signal, and reflect, to the polarization detector, reflected light obtained after the output light of the laser is reflected.

The polarization detector 1202 is configured to detect whether a polarization direction of the reflected light is perpendicular to a polarization direction of the first optical signal, and transmit the reflected light whose polarization direction is perpendicular to the polarization direction of the first optical signal.

A polarization direction preset by the polarization detector 1202 is perpendicular to the polarization direction of the first optical signal, and the polarization detector 1202 can only transmit the reflected light reflected back by the Faraday rotation mirror. Because a polarization direction of light reflected back due to a problem such as a fiber break is arbitrary, the light is shielded by the polarization detector 1202, and cannot be transmitted.

The sixth photodiode 1203 is configured to receive the first optical signal to obtain a first optical power value, and obtain the power value of the output light according to the first optical power value.

The seventh photodiode 1204 is configured to receive the reflected light transmitted from the polarization detector, to obtain the power value of the reflected light when the polarization direction of the reflected light is perpendicular to the polarization direction of the first optical signal.

The first optical signal is received by the sixth photodiode 1203 to obtain through measurement the first optical power value of the first optical signal. The power value of the output light is obtained according to the first optical power value. For details, refer to the description in Embodiment 5, which are not described herein again.

The second processing sub-device 802 is configured to obtain an insertion loss value according to the power value of the output light, the power value of the reflected light, and a parameter of the Faraday rotation mirror, and obtain a bias current value according to the insertion loss value when the power of the output light of the laser is adjusted.

The insertion loss value is a power loss, of the output light of the laser, on a one-way link between the laser and the Faraday rotation mirror.

The second driving sub-device 804 is configured to adjust the power of the output light of the laser using the bias current value when the power of the output light of the laser is adjusted.

A method for adjusting power of output light of a laser is similar to that of Embodiment 5. For details, refer to the description in Embodiment 4, which are not described herein again.

Embodiment 12

Figure 13:
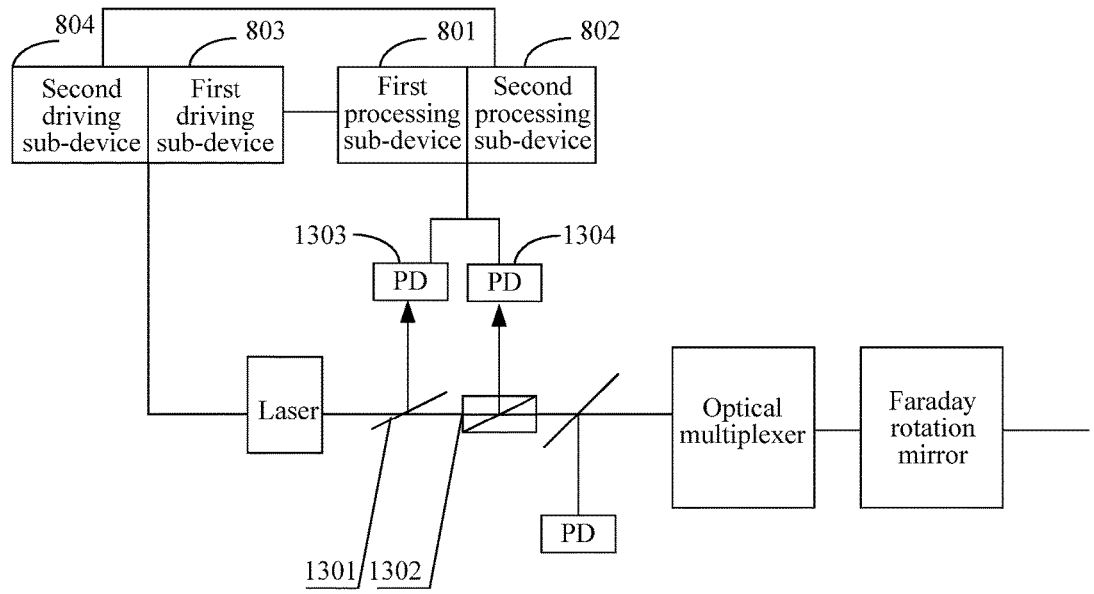
FIG. 13 is a schematic structural diagram of Embodiment 12 of an apparatus for adjusting an emission parameter of a laser in a WDM-PON according to the present disclosure.

FIG. 13 is a schematic structural diagram of Embodiment 12 of an apparatus for adjusting an emission parameter of a laser in a WDM-PON according to the present disclosure. The apparatus of Embodiment 12 corresponds to the method of Embodiment 5. Output light of the laser is split using a partial reflector, and reflected light is transmitted using a polarization beam splitter. The apparatus includes a monitoring device, including a partial reflector 1301, a polarization beam splitter 1302, an eighth photodiode 1303, and a ninth photodiode 1304, where the polarization beam splitter 1302 is disposed on a propagation channel of the output light.

When a wavelength of the output light of the laser is calibrated:

The polarization beam splitter 1302 is configured to detect whether polarization directions of multiple pieces of reflected light obtained after multiple pieces of output light of the laser are reflected are perpendicular to a polarization direction of the output light, and transmit the multiple pieces of reflected light whose polarization directions are perpendicular to the polarization direction of the output light.

The polarization beam splitter 1302 may transmit an optical signal in a preset polarization direction, and can only transmit light whose polarization direction is perpendicular to the polarization direction of the output light. In this way, it can be ensured that the received multiple pieces of reflected light are a part of output light that is reflected back by a Faraday rotation mirror rather than light reflected back due to a fiber break or another reason.

The ninth photodiode 1304 is configured to receive the multiple pieces of reflected light transmitted from the polarization beam splitter, to obtain power values of the multiple pieces of reflected light when the polarization directions of the multiple pieces of reflected light are perpendicular to the polarization direction of the output light, where a power value of each piece of reflected light corresponds to a group of wavelength setting parameters.

The first processing sub-device 801 is configured to obtain a wavelength setting parameter corresponding to a maximum power value of the reflected light, as a wavelength calibration parameter when the wavelength of the output light of the laser is calibrated.

The first driving sub-device 803 is configured to calibrate the wavelength of the output light of the laser according to the wavelength calibration parameter when the wavelength of the output light of the laser is calibrated.

Multiple different groups of wavelength setting parameters are input to a tunable laser, and each group of wavelength setting parameters drives the tunable laser to output optical signals with different wavelengths when the system is started. The output light with different wavelengths is transmitted to an optical multiplexer, the light transmitted by the optical multiplexer is input to a Faraday rotation mirror disposed at a common port of the optical multiplexer, and a part of the output light reflected back by the Faraday rotation mirror is used as reflected light and reflected back to the planar optical waveguide, where a polarization direction of the reflected light is perpendicular to a polarization direction of the output light. The pieces of reflected light input to the planar optical waveguide are transmitted to the ninth photodiode 1304 using the polarization beam splitter 1302. The ninth photodiode 1304 measures power values of reflected light when multiple different wavelength setting parameters are used. The wavelength of the output light of the laser is a transmission wavelength of a distribution port of the optical multiplexer, a wavelength setting parameter corresponding to the power value of the reflected light is a wavelength calibration parameter, and the wavelength of the output light of the laser is calibrated according to the wavelength calibration parameter when the reflected light has a maximum power value.

When power of the output light of the laser is adjusted:

The partial reflector 1301 is configured to split light in a first preset proportion from the output light of the laser as a first optical signal.

The polarization beam splitter 1302 is configured to detect whether a polarization direction of reflected light obtained after the output light of the laser is reflected is perpendicular to a polarization direction of the first optical signal, and transmit the reflected light whose polarization direction is perpendicular to the polarization direction of the first optical signal.

The eighth photodiode 1303 is configured to receive the first optical signal to obtain a first optical power value, and obtain the power value of the output light according to the first optical power value.

The ninth photodiode 1304 is configured to receive the reflected light transmitted from the polarization beam splitter, to obtain the power value of the reflected light when the polarization direction of the reflected light is perpendicular to the polarization direction of the first optical signal.

The first optical signal is received by the eighth photodiode 1303 to obtain through measurement the first optical power value of the first optical signal. The power value of the output light is obtained according to the first optical power value. For details, refer to the description in Embodiment 5, which are not described herein again.

The second processing sub-device 802 is configured to obtain an insertion loss value according to the power value of the output light, the power value of the reflected light, and a parameter of the Faraday rotation mirror, and obtain a bias current value according to the insertion loss value when the power of the output light of the laser is adjusted.

The insertion loss value is a power loss, of the output light of the laser, on a one-way link between the laser and the Faraday rotation mirror.

The second driving sub-device 804 is configured to adjust the power of the output light of the laser using the bias current value when the power of the output light of the laser is adjusted.

A method for adjusting power of output light of a laser is similar to that of Embodiment 5. For details, refer to the description in Embodiment 4, which are not described herein again.

Embodiment 13

Figure 14:
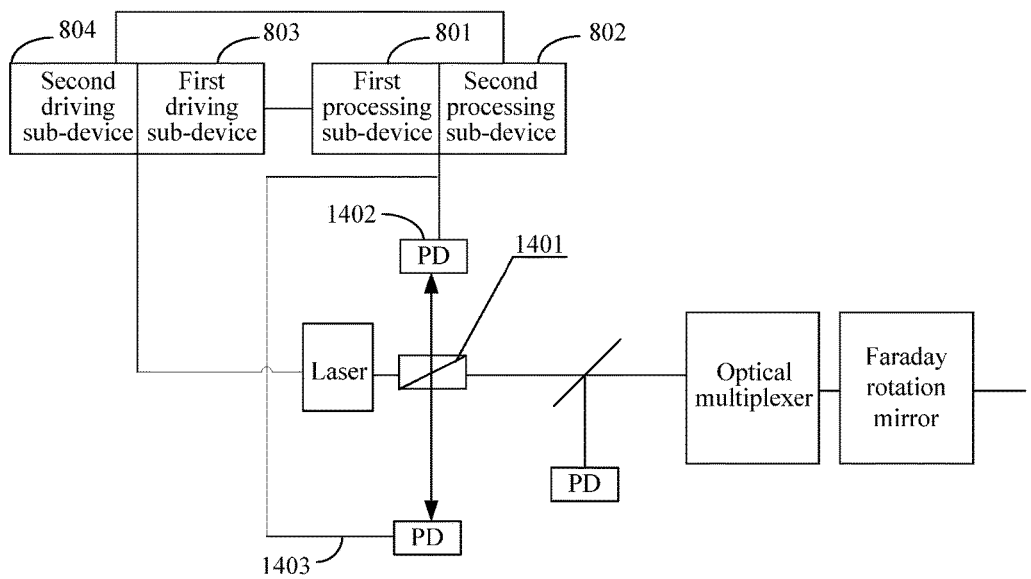
FIG. 14 is a schematic structural diagram of Embodiment 13 of an apparatus for adjusting an emission parameter of a laser in a WDM-PON according to the present disclosure.

FIG. 14 is a schematic structural diagram of Embodiment 13 of an apparatus for adjusting an emission parameter of a laser in a WDM-PON according to the present disclosure. The apparatus of Embodiment 13 corresponds to the method of Embodiment 5. Output light of the laser is split and reflected light is transmitted using a polarization beam splitter with a partial reflection function. The apparatus includes a monitoring device, including a polarization beam splitter 1401 with a partial reflection function, a tenth photodiode 1402, and an eleventh photodiode 1403, where the polarization beam splitter 1401 with a partial reflection function is disposed on a propagation channel of the output light.

When an output wavelength of the laser is calibrated:

The polarization beam splitter 1401 with a partial reflection function is configured to detect whether polarization directions of multiple pieces of reflected light obtained after multiple pieces of output light of the laser are reflected are perpendicular to a polarization direction of the output light, and transmit the multiple pieces of reflected light whose polarization directions are perpendicular to the polarization direction of the output light.

The polarization beam splitter 1401 with a partial reflection function may transmit an optical signal in a preset polarization direction, and can only transmit light whose polarization direction is perpendicular to the polarization direction of the output light. In this way, it can be ensured that the received multiple pieces of reflected light are a part of output light that is reflected back by a Faraday rotation mirror rather than light reflected back due to a fiber break or another reason.

The eleventh photodiode 1403 is configured to receive the multiple pieces of reflected light transmitted from the polarization beam splitter with a partial reflection function, to obtain power values of the multiple pieces of reflected light when the polarization directions of the multiple pieces of reflected light are perpendicular to the polarization direction of the output light, where a power value of each piece of reflected light corresponds to a group of wavelength setting parameters.

The first processing sub-device 801 is configured to obtain a wavelength setting parameter corresponding to a maximum power value of the reflected light, as a wavelength calibration parameter when the wavelength of the output light of the laser is calibrated.

The first driving sub-device 803 is configured to calibrate the wavelength of the output light of the laser according to the wavelength calibration parameter when the wavelength of the output light of the laser is calibrated.

Multiple different groups of wavelength setting parameters are input to a tunable laser, and each group of wavelength setting parameters drives the tunable laser to output optical signals with different wavelengths when the system is started. The output light with different wavelengths is transmitted to an optical multiplexer using a fiber, the light transmitted by the optical multiplexer is input to a Faraday rotation mirror disposed at a common port of the optical multiplexer, and a part of the output light reflected back by the Faraday rotation mirror is used as reflected light and reflected back to a transmission fiber, where a polarization direction of the reflected light is perpendicular to a polarization direction of the output light. The pieces of reflected light input to the transmission fiber are transmitted to the polarization beam splitter 1401 with a partial reflection function, and transmitted to the eleventh photodiode 1403 using multiple pieces of reflected light of the polarization beam splitter 1401 with a partial reflection function. The eleventh photodiode 1403 measures power values of reflected light when multiple different wavelength setting parameters are used. The wavelength of the output light of the laser is a transmission wavelength of a distribution port of the optical multiplexer, a wavelength setting parameter corresponding to the power value of the reflected light is a wavelength calibration parameter, and the wavelength of the output light of the laser is calibrated according to the wavelength calibration parameter when the reflected light has a maximum power value.

When power of the output light of the laser is adjusted:

The polarization beam splitter 1401 with a partial reflection function is configured to split light in a first preset proportion from the output light of the laser as a first optical signal, detect whether a polarization direction of the reflected light obtained after the output light of the laser is reflected is perpendicular to a polarization direction of the first optical signal, and transmit the reflected light whose polarization direction is perpendicular to the polarization direction of the first optical signal.

The tenth photodiode 1402 is configured to receive the first optical signal to obtain a first optical power value, and obtain the power value of the output light according to the first optical power value.

The eleventh photodiode 1403 is configured to receive the reflected light transmitted from the polarization beam splitter with a partial reflection function, to obtain the power value of the reflected light when the polarization direction of the reflected light is perpendicular to the polarization direction of the first optical signal.

The first optical signal is received by the tenth photodiode 1402 to obtain through measurement the first optical power value of the first optical signal. The power value of the output light is obtained according to the first optical power value. For details, refer to the description in Embodiment 5, which are not described herein again.

The second processing sub-device 802 is configured to obtain an insertion loss value according to the power value of the output light, the power value of the reflected light, and a parameter of the Faraday rotation mirror, and obtain a bias current value according to the insertion loss value when the power of the output light of the laser is adjusted.

The insertion loss value is a power loss, of the output light of the laser, on a one-way link between the laser and the Faraday rotation mirror.

The second driving sub-device 804 is configured to adjust the power of the output light of the laser using the bias current value when the power of the output light of the laser is adjusted.

A method for adjusting power of output light of a laser is similar to that of Embodiment 5. For details, refer to the description in Embodiment 4, which are not described herein again.

Embodiment 14

Figure 15:
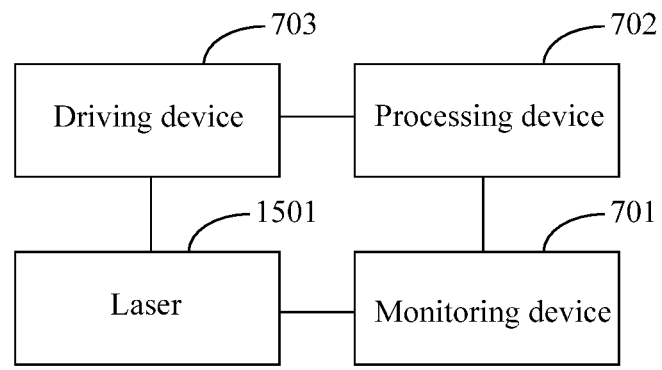
FIG. 15 is a schematic structural diagram of Embodiment 14 of an optical network unit in a WDM-PON system according to the present disclosure.

FIG. 15 is a schematic structural diagram of Embodiment 14 of an optical network unit in a WDM-PON system according to the present disclosure. The optical network unit includes a laser 1501 and the apparatus for adjusting an emission parameter of a laser according to any one of Embodiment 6 to Embodiment 13, where the apparatus for adjusting an emission parameter of a laser includes a monitoring device 701, a processing device 702, and a driving device 703, where the monitoring device 701 is disposed on a transmission channel of output light of the laser 1501, the processing device 702 is connected to the monitoring device 701, and the driving device 703 is separately connected to the processing device 702 and the laser 1501.

In actual application, the optical network unit further includes a wavelength division multiplexer and a link signal receiver, where the wavelength division multiplexer is configured to identify and reflect a link optical signal sent by an optical line terminal in the WDM-PON system, and the link signal receiver is configured to receive the link optical signal.

Further, a photodiode may be used as the link signal receiver.

Embodiment 15

Figure 16:
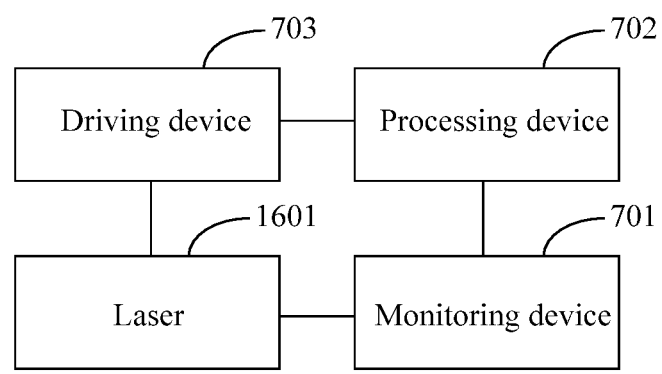
FIG. 16 is a schematic structural diagram of Embodiment 15 of an optical line terminal in a WDM-PON system according to the present disclosure.

FIG. 16 is a schematic structural diagram of Embodiment 15 of an optical line terminal in a WDM-PON system according to the present disclosure. The optical line terminal includes a laser 1601 and the apparatus for adjusting an emission parameter of a laser according to any one of Embodiment 6 to Embodiment 13, where the apparatus for adjusting an emission parameter of a laser includes a monitoring device 701, a processing device 702, and a driving device 703, where the monitoring device 701 is disposed on a transmission channel of output light of the laser 1601, the processing device 702 is connected to the monitoring device 701, and the driving device 703 is separately connected to the processing device 702 and the laser 1601.

In actual application, the optical network unit further includes a wavelength division multiplexer and a link signal receiver, where the wavelength division multiplexer is configured to identify and reflect a link optical signal sent by an optical network unit in the WDM-PON system, and the link signal receiver is configured to receive the link optical signal.

Further, a photodiode may be used as the link signal receiver.

Embodiment 16

Figure 17:
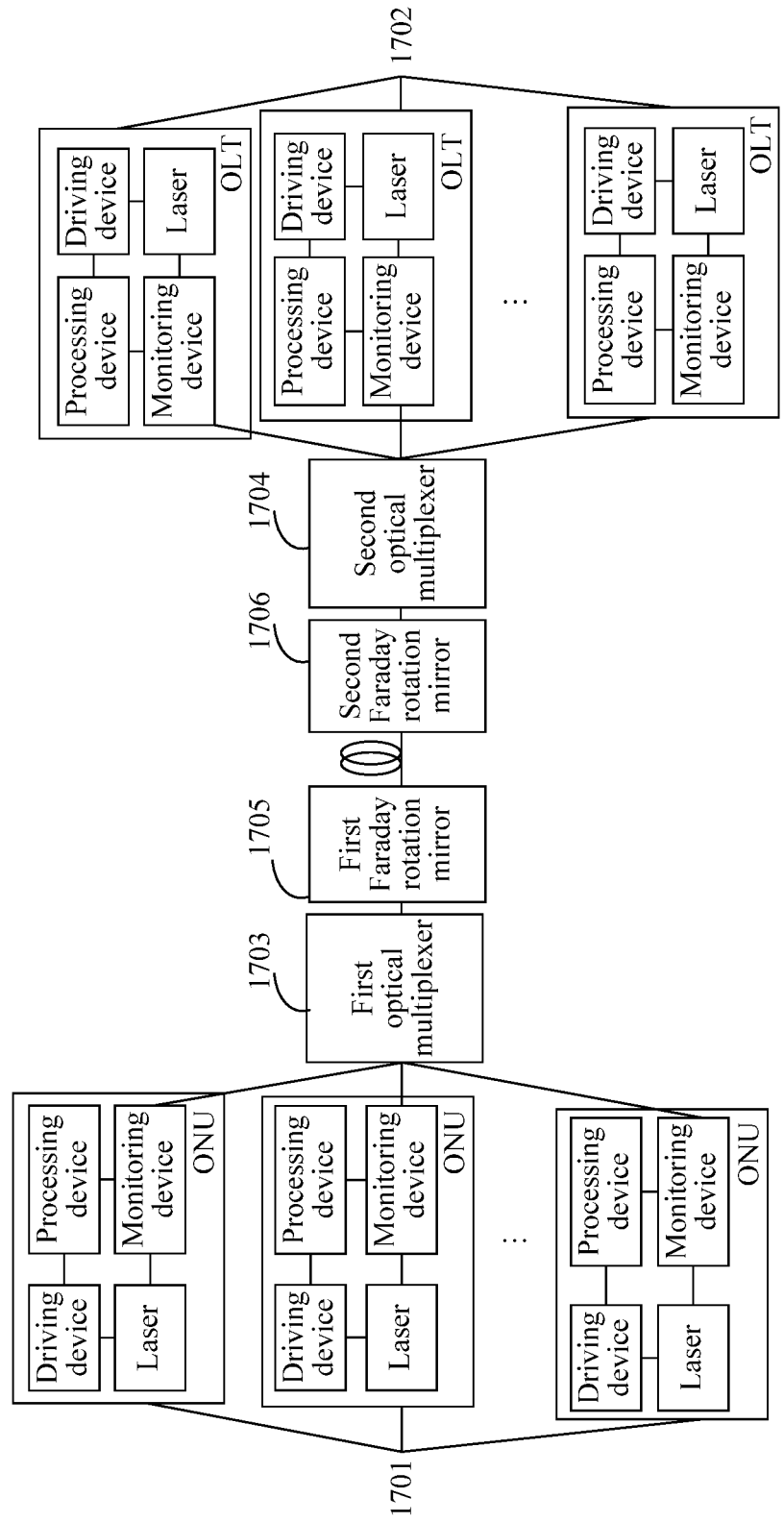
FIG. 17 is a schematic structural diagram of Embodiment 16 of a wavelength division multiplexing passive optical network system according to the present disclosure.

FIG. 17 is a schematic structural diagram of Embodiment 16 of a wavelength division multiplexing passive optical network system according to the present disclosure. The system includes an optical network unit 1701 according to Embodiment 14, an optical line terminal 1702 according to Embodiment 15, a first optical multiplexer 1703 and a second optical multiplexer 1704, and a first Faraday rotation mirror 1705 and a second Faraday rotation mirror 1706, where the optical network unit according to Embodiment 14 is connected to a distribution port of the first optical multiplexer 1703, and the first Faraday rotation mirror 1705 is disposed at a common port of the first optical multiplexer 1703. The optical line terminal 1702 according to Embodiment 15 is connected to a distribution port of the second optical multiplexer 1704, and the second Faraday rotation mirror 1706 is disposed at a common port of the second optical multiplexer 1704. An output end of the first Faraday rotation mirror 1705 is connected to an output end of the second Faraday rotation mirror 1706. The first optical multiplexer 1703 is configured to multiplex multiple pieces of output light, received by the distribution port, of the optical network unit 1701 according to Embodiment 14 and output the multiple pieces of output light to the common port, and demultiplex, to the distribution port, a part of a multiplexed optical signal reflected back by the first Faraday rotation mirror 1705. The first Faraday rotation mirror 1705 is configured to reflect back, to the common port of the first optical multiplexer 1703, the part of the multiplexed optical signal that is output by the common port of the first optical multiplexer 1703, and transmit the other part to a transmission fiber. The second optical multiplexer 1704 is configured to multiplex output light, received by the distribution port, of the optical line terminal 1702 according to Embodiment 15 and output the output light to the common port, and demultiplex, to the distribution port, a part of a multiplexed optical signal reflected back by the second Faraday rotation mirror 1706, and the second Faraday rotation mirror 1706 is configured to reflect back, to the common port of the second optical multiplexer 1704, the part of the multiplexed optical signal that is output by the common port of the second optical multiplexer 1704, and transmit the other part to the transmission fiber.

Obviously, a person skilled in the art can make various modifications and variations to the present disclosure without departing from the scope of the present disclosure. The present disclosure is intended to cover these modifications and variations provided that they fall within the scope of protection defined by the following claims and their equivalent technologies.

What is claimed is:
1. A method for adjusting an emission parameter of a laser, wherein the method is applied to a wavelength division multiplexing passive optical network system, and wherein the method comprises:
    monitoring a power value of output light of the laser and a power value of reflected light, wherein the reflected light is light reflected back by a Faraday rotation mirror when the output light passes through the Faraday rotation mirror;
    obtaining an insertion loss value according to the power value of the output light, the power value of the reflected light, and a parameter of the Faraday rotation mirror, wherein the insertion loss value is a power loss, of the output light of the laser, on a one-way link between the laser and the Faraday rotation mirror;
    obtaining a bias current value according to the insertion loss value; and
    adjusting the power value of the output light of the laser using the obtained bias current value.
2. The method according to claim 1, wherein monitoring the power value of output light of the laser and the power value of reflected light comprises:
    splitting light in a first preset proportion from the output light of the laser as a first optical signal;
    splitting light in a second preset proportion from the reflected light as a second optical signal;

detecting whether a polarization direction of the second optical signal is perpendicular to a polarization direction of the first optical signal;
receiving both the first optical signal and the second optical signal, to obtain a power sum of the first optical signal and the second optical signal as a combined optical power value when the polarization direction of the second optical signal is perpendicular to the polarization direction of the first optical signal;
shielding the first optical signal;
receiving the unshielded second optical signal, to obtain power of the unshielded second optical signal as a tributary optical power value; and
obtaining the power value of the output light and the power value of the reflected light according to the combined optical power value and the tributary optical power value.

3. The method according to claim 1, wherein monitoring the power value of output light of the laser and the power value of reflected light comprises:
splitting light in a first preset proportion from the output light of the laser as a first optical signal;
splitting light in a second preset proportion from the reflected light as a second optical signal;
detecting whether a polarization direction of the second optical signal is perpendicular to a polarization direction of the first optical signal;
receiving both the first optical signal and the second optical signal, to obtain a power sum of the first optical signal and the second optical signal as a combined optical power value when the polarization direction of the second optical signal is perpendicular to the polarization direction of the first optical signal;
shielding the second optical signal;
receiving the unshielded first optical signal, to obtain power of the unshielded first optical signal as a tributary optical power value; and
obtaining the power value of the output light and the power value of the reflected light according to the combined optical power value and the tributary optical power value.

4. The method according to claim 1, wherein monitoring the power value of output light of the laser and the power value of reflected light comprises:
splitting light in a first preset proportion from the output light of the laser as a first optical signal;
splitting light in a second preset proportion from the reflected light as a second optical signal;
receiving the first optical signal to obtain a first optical power value;
detecting whether a polarization direction of the second optical signal is perpendicular to a polarization direction of the first optical signal;
receiving the second optical signal to obtain a second optical power value when the polarization direction of the second optical signal is perpendicular to the polarization direction of the first optical signal;
obtaining the power value of the output light according to the first optical power value; and
obtaining the power value of the reflected light according to the second optical power value.

5. The method according to claim 1, wherein monitoring the power value of output light of the laser and the power value of reflected light comprises:
splitting light in a first preset proportion from the output light of the laser as a first optical signal;
receiving the first optical signal to obtain a first optical power value;
obtaining the power value of the output light according to the first optical power value;
detecting whether a polarization direction of the reflected light is perpendicular to a polarization direction of the first optical signal; and
receiving the reflected light to obtain the power value of the reflected light when the polarization direction of the reflected light is perpendicular to the polarization direction of the first optical signal.

6. The method according to claim 1, wherein obtaining the bias current value comprises:
querying a first pre-configured file, wherein the first pre-configured file comprises a correspondence between a bias current of the laser and the insertion loss value, of the output light of the laser, on the one-way link between the laser and the Faraday rotation mirror; and
obtaining, in the first pre-configured file, the bias current value corresponding to the insertion loss value.

7. The method according to claim 1, wherein obtaining the bias current value comprises:
calculating a fiber length of the one-way link between the laser and the Faraday rotation mirror according to the insertion loss value;
querying a second pre-configured file, wherein the second pre-configured file comprises a correspondence between the fiber length and a bias current of the laser; and
obtaining, in the second pre-configured file, the bias current value corresponding to the fiber length.

8. An apparatus for adjusting an emission parameter of a laser, wherein the apparatus is applied to a wavelength division multiplexing passive optical network system, and wherein the apparatus comprises:
a monitoring device configured to monitor a power value of output light of the laser and a power value of reflected light, wherein the reflected light is light reflected back by a Faraday rotation mirror when the output light passes through the Faraday rotation mirror;
a processing device configured to:
obtain an insertion loss value according to the power value of the output light, the power value of the reflected light, and a parameter of the Faraday rotation mirror; and
obtain a bias current value according to the insertion loss value, wherein the insertion loss value is a power loss, of the output light of the laser, on a one-way link between the laser and the Faraday rotation mirror; and
a driving device configured to adjust power of the output light of the laser using the obtained bias current value.

9. The apparatus according to claim 8, wherein the monitoring device comprises:
a planar optical waveguide;
a variable optical attenuator;
a polarization beam splitter; and
a first photodiode,
wherein two optical splitting grooves are engraved on the planar optical waveguide,
wherein the variable optical attenuator is disposed on either optical splitting groove,
wherein the polarization beam splitter is disposed at an intersection of the two optical splitting grooves, wherein a first optical splitting groove is configured to split light in a first preset proportion from the output light of the laser as a first optical signal,
wherein a second optical splitting groove is configured to split light in a second preset proportion from the reflected light as a second optical signal,
wherein the polarization beam splitter is configured to:
　detect whether a polarization direction of the second optical signal is perpendicular to a polarization direction of the first optical signal; and
　transmit the first optical signal and the second optical signal whose polarization direction is perpendicular to the polarization direction of the first optical signal,
wherein the variable optical attenuator is configured to shield the first optical signal transmitted on the optical splitting groove in which the variable optical attenuator is located, and
wherein the first photodiode is configured to:
　receive both the first optical signal and the second optical signal, to obtain a power sum of the first optical signal and the second optical signal as a combined optical power value when the polarization direction of the second optical signal is perpendicular to the polarization direction of the first optical signal;
　receive power of the unshielded second optical signal as a tributary optical power value; and
　obtain the power of the output light and the power value of the reflected light according to the combined optical power value and the tributary optical power value.

10. The apparatus according to claim 9, wherein the processing device is further configured to:
　query a first pre-configured file, wherein the first pre-configured file comprises a correspondence between a bias current of the laser and the insertion loss value, of the output light of the laser, on the one-way link between the laser and the Faraday rotation mirror; and
　obtain, in the first pre-configured file, the bias current value corresponding to the insertion loss value.

11. The apparatus according to claim 9, wherein the processing device further configured to:
　calculate a fiber length of the one-way link between the laser and the Faraday rotation mirror according to the insertion loss value;
　query a second pre-configured file, wherein the second pre-configured file comprises a correspondence between the fiber length and a bias current of the laser; and
　obtain, in the second pre-configured file, the bias current value corresponding to the fiber length.

12. The apparatus according to claim 8, wherein the monitoring device comprises:
　a planar optical waveguide;
　a variable optical attenuator;
　a polarization beam splitter; and
　a first photodiode,
　wherein two optical splitting grooves are engraved on the planar optical waveguide,
　wherein the variable optical attenuator is disposed on either optical splitting groove,
　wherein the polarization beam splitter is disposed at an intersection of the two optical splitting grooves,
　wherein a first optical splitting groove is configured to split light in a first preset proportion from the output light of the laser as a first optical signal,
　wherein a second optical splitting groove is configured to split light in a second preset proportion from the reflected light as a second optical signal,
　wherein the polarization beam splitter is configured to:
　　detect whether a polarization direction of the second optical signal is perpendicular to a polarization direction of the first optical signal; and
　　transmit the first optical signal and the second optical signal whose polarization direction is perpendicular to the polarization direction of the first optical signal,
　wherein the variable optical attenuator is configured to shield the second optical signal transmitted on the optical splitting groove in which the variable optical attenuator is located, and
　wherein the first photodiode is configured to:
　　receive both the first optical signal and the second optical signal, to obtain a power sum of the first optical signal and the second optical signal as a combined optical power value when the polarization direction of the second optical signal is perpendicular to the polarization direction of the first optical signal;
　　receive power of the unshielded first optical signal as a tributary optical power value; and
　　obtain the power of the output light and the power value of the reflected light according to the combined optical power value and the tributary optical power value.

13. The apparatus according to claim 8, wherein the monitoring device comprises:
　a planar optical waveguide;
　two polarization detectors;
　a second photodiode; and
　a third photodiode,
　wherein a polarization detector is a polarization analyzer or a polarization beam splitter,
　wherein two optical splitting grooves are engraved on the planar optical waveguide,
　　wherein each optical splitting groove is provided with one polarization detector,
　　wherein a first optical splitting groove is configured to split light in a first preset proportion from the output light of the laser as a first optical signal,
　　wherein a second optical splitting groove is configured to split light in a second preset proportion from the reflected light as a second optical signal,
　wherein the two polarization detectors are configured to detect whether a polarization direction of the second optical signal is perpendicular to a polarization direction of the first optical signal, wherein each polarization detector can only transmit an optical signal in a preset polarization direction,
　wherein the second photodiode is configured to:
　　receive the first optical signal to obtain a first optical power value; and
　　obtain the power value of the output light according to the first optical power value, and
　wherein the third photodiode is configured to:
　　receive the second optical signal to obtain a second optical power value when the polarization direction of the second optical signal is perpendicular to the polarization direction of the first optical signal; and
　　obtain the power value of the reflected light according to the second optical power value.

14. The apparatus according to claim 8, wherein the monitoring device comprises:
a planar optical waveguide;
a polarization beam splitter;
a fourth photodiode; and
a fifth photodiode,
wherein the polarization beam splitter is disposed on a transmission channel of the output light,
wherein one optical splitting groove is engraved on the planar optical waveguide,
wherein the optical splitting groove is configured to split light in a first preset proportion from the output light of the laser as a first optical signal,
wherein the polarization beam splitter is configured to:
detect whether a polarization direction of the reflected light that is reflected back is perpendicular to a polarization direction of the first optical signal; and
transmit the reflected light whose polarization direction is perpendicular to the polarization direction of the first optical signal,
wherein the fourth photodiode is configured to:
receive the first optical signal to obtain a first optical power value; and
obtain the power value of the output light according to the first optical power value, and
wherein the fifth photodiode is configured to receive the reflected light transmitted from the polarization beam splitter when the polarization direction of the reflected light is perpendicular to the polarization direction of the first optical signal, to obtain the power value of the reflected light.

15. The apparatus according to claim 8, wherein the monitoring device comprises:
a partial reflector;
a polarization detector;
a sixth photodiode; and
a seventh photodiode,
wherein the polarization detector is a polarization analyzer or a polarization beam splitter,
wherein the partial reflector is configured to:
split light in a first preset proportion from the output light of the laser as a first optical signal; and
reflect the reflected light to the polarization detector,
wherein the polarization detector is configured to:
detect whether a polarization direction of the reflected light is perpendicular to a polarization direction of the first optical signal; and
transmit the reflected light whose polarization direction is perpendicular to the polarization direction of the first optical signal,
wherein the sixth photodiode is configured to:
receive the first optical signal to obtain a first optical power value; and
obtain the power value of the output light according to the first optical power value, and
wherein the seventh photodiode is configured to receive the reflected light transmitted from the polarization detector when the polarization direction of the reflected light is perpendicular to the polarization direction of the first optical signal, to obtain the power value of the reflected light.

16. The apparatus according to claim 8, wherein the monitoring device comprises:
a partial reflector;
a polarization beam splitter;
an eighth photodiode; and
a ninth photodiode,
wherein the polarization beam splitter is disposed on a propagation channel of the output light,
wherein the partial reflector is configured to split light in a first preset proportion from the output light of the laser as a first optical signal,
wherein the polarization beam splitter is configured to:
detect whether a polarization direction of the reflected light is perpendicular to a polarization direction of the first optical signal; and
transmit the reflected light whose polarization direction is perpendicular to the polarization direction of the first optical signal,
wherein the eighth photodiode is configured to:
receive the first optical signal to obtain a first optical power value; and
obtain the power value of the output light according to the first optical power value, and
wherein the ninth photodiode is configured to receive the reflected light transmitted from the polarization beam splitter when the polarization direction of the reflected light is perpendicular to the polarization direction of the first optical signal, to obtain the power value of the reflected light.

17. The system according to claim 8, wherein the monitoring device comprises:
a polarization beam splitter with a partial reflection function;
a tenth photodiode; and
an eleventh photodiode,
wherein the polarization beam splitter with the partial reflection function is disposed on a propagation channel of the output light,
wherein the polarization beam splitter with the partial reflection function is configured to:
split light in a first preset proportion from the output light of the laser as a first optical signal;
detect whether a polarization direction of the reflected light is perpendicular to a polarization direction of the first optical signal; and
transmit the reflected light whose polarization direction is perpendicular to the polarization direction of the first optical signal,
wherein the tenth photodiode is configured to:
receive the first optical signal to obtain a first optical power value; and
obtain the power value of the output light according to the first optical power value, and
wherein the eleventh photodiode is configured to receive the reflected light transmitted from the polarization beam splitter with the partial reflection function when the polarization direction of the reflected light is perpendicular to the polarization direction of the first optical signal, to obtain the power value of the reflected light.

18. An optical network unit, comprising:
a laser; and
an apparatus for adjusting an emission parameter of the laser, wherein the apparatus is applied to a wavelength division multiplexing passive optical network system, and wherein the apparatus comprises:
a monitoring device disposed on a transmission channel of output light of the laser and configured to monitor a power value of output light of the laser and a power value of reflected light, wherein the reflected light is light reflected back by a Faraday rotation mirror when the output light passes through the Faraday rotation mirror;

a processing device connected to the monitoring device and configured to:
obtain an insertion loss value according to the power value of the output light, the power value of the reflected light, and a parameter of the Faraday rotation mirror; and
obtain a bias current value according to the insertion loss value, wherein the insertion loss value is a power loss, of the output light of the laser, on a one-way link between the laser and the Faraday rotation mirror; and
a driving device separately connected to the processing device and the laser and configured to adjust power of the output light of the laser using the obtained bias current value.

19. An optical line terminal, comprising:
a laser; and
an apparatus for adjusting an emission parameter of the laser,
wherein the apparatus is applied to a wavelength division multiplexing passive optical network system, and wherein the apparatus comprises:
a monitoring device disposed on a transmission channel of output light of the laser and configured to monitor a power value of the output light of the laser and a power value of reflected light, wherein the reflected light is light reflected back by a Faraday rotation mirror when the output light passes through the Faraday rotation mirror;
a processing device connected to the monitoring device and configured to:
obtain an insertion loss value according to the power value of the output light, the power value of the reflected light, and a parameter of the Faraday rotation mirror; and
obtain a bias current value according to the insertion loss value, wherein the insertion loss value is a power loss, of the output light of the laser, on a one-way link between the laser and the Faraday rotation mirror; and
a driving device separately connected to the processing device and the laser and configured to adjust power of the output light of the laser using the obtained bias current value.

20. A wavelength division multiplexing passive optical network system, wherein the system comprises:
an optical network unit;
an optical line terminal;
two optical multiplexers; and
two Faraday rotation mirrors,
wherein the optical network unit is connected to a distribution port of a first optical multiplexer, wherein a first Faraday rotation mirror is disposed at a common port of the first optical multiplexer, and wherein the optical network unit comprises:
a laser; and
an apparatus for adjusting an emission parameter of the laser, wherein the apparatus is applied to the wavelength division multiplexing passive optical network system, and wherein the apparatus comprises:
a monitoring device disposed on a transmission channel of output light of the laser and configured to monitor a power value of the output light of the laser and a power value of reflected light, wherein the reflected light is light reflected back by the first Faraday rotation mirror when the output light passes through the first Faraday rotation mirror;

a processing device connected to the monitoring device and configured to:
obtain an insertion loss value according to the power value of the output light, the power value of the reflected light, and a parameter of the first Faraday rotation mirror; and
obtain a bias current value according to the insertion loss value, wherein the insertion loss value is a power loss, of the output light of the laser, on a one-way link between the laser and the first Faraday rotation mirror; and
a driving device separately connected to the processing device and the laser and configured to adjust power of the output light of the laser using the obtained bias current value,
wherein the optical line terminal is connected to a distribution port of a second optical multiplexer, wherein a second Faraday rotation mirror is disposed at a common port of the second optical multiplexer, wherein the optical line terminal comprises a second apparatus for adjusting an emission parameter of a second laser, wherein the second apparatus is applied to the wavelength division multiplexing passive optical network system, and wherein the second apparatus comprises:
a second monitoring device disposed on a transmission channel of output light of the second laser and configured to monitor a power value of output light of the second laser and a power value of a second reflected light, wherein the second reflected light is light reflected back by the second Faraday rotation mirror when the output light of the second laser passes through the second Faraday rotation mirror;
a second processing device connected to the second monitoring device and configured to:
obtain a second insertion loss value according to the power value of the output light of the second laser, the power value of the second reflected light, and a parameter of the second Faraday rotation mirror; and
obtain a second bias current value according to the second insertion loss value, wherein the second insertion loss value is a power loss, of the output light of the second laser, on a one-way link between the second laser and the second Faraday rotation mirror; and
a second driving device separately connected to the second processing device and the second laser and configured to adjust power of the output light of the second laser using the obtained second bias current value,
wherein an output end of the first Faraday rotation mirror is connected to an output end of the second Faraday rotation mirror,
wherein the first optical multiplexer is configured to:
multiplex output light, received by the distribution port, of the optical network unit;
output the output light to the common port of the first optical multiplexer; and
demultiplex, to the distribution port, a part of a multiplexed optical signal reflected back by the first Faraday rotation mirror, wherein the first Faraday rotation mirror is configured to:
reflect back, to the common port of the first optical multiplexer, the part of the multiplexed optical signal that is output by the common port of the first optical multiplexer; and transmit the other part of the multiplexed optical signal that is output by the common port of the first optical multiplexer to a transmission fiber, wherein the second optical multiplexer is configured to:

multiplex output light of the second laser, received by the distribution port, of the optical line terminal;

output the output light of the second laser to the common port the second optical multiplexer; and demultiplex, to the distribution port, a part of a multiplexed optical signal reflected back by the second Faraday rotation mirror, and wherein the second Faraday rotation mirror is configured to:

reflect back, to the common port of the second optical multiplexer, the part of the multiplexed optical signal that is output by the common port of the second optical multiplexer; and transmit the other part of the multiplexed optical signal that is output by the common port of the second optical multiplexer to the transmission fiber.

* * * * *